US011253088B2

(12) United States Patent
Wittig

(10) Patent No.: US 11,253,088 B2
(45) Date of Patent: Feb. 22, 2022

(54) DRAWER DEVICE FOR STORING PIECE GOOD, STORAGE DEVICE HAVING A DRAWER DEVICE, AND RELATED METHODS

(71) Applicant: WÜRTH INTERNATIONAL AG, Chur (CH)

(72) Inventor: Klaus Wittig, Öhringen (DE)

(73) Assignee: WURTH INTERNATIONAL AG, Chur (CH)

( * ) Notice: Subject to any disclaimer, the term of this patent is extended or adjusted under 35 U.S.C. 154(b) by 951 days.

(21) Appl. No.: 16/080,648

(22) PCT Filed: Nov. 18, 2016

(86) PCT No.: PCT/DE2016/000405
§ 371 (c)(1),
(2) Date: Aug. 28, 2018

(87) PCT Pub. No.: WO2017/084650
PCT Pub. Date: May 26, 2017

(65) Prior Publication Data
US 2021/0269239 A1  Sep. 2, 2021

(30) Foreign Application Priority Data

Nov. 18, 2015 (DE) .......................... 102015120000.7

(51) Int. Cl.
*G06F 7/00* (2006.01)
*A47F 10/02* (2006.01)
(Continued)

(52) U.S. Cl.
CPC ............ *A47F 10/02* (2013.01); *A47B 88/969* (2017.01); *A47F 3/002* (2013.01); *A47F 5/16* (2013.01);
(Continued)

(58) Field of Classification Search
USPC ................................................. 700/213–216
See application file for complete search history.

(56) References Cited

U.S. PATENT DOCUMENTS

| 4,866,661 A | 9/1989 | De Prins |
| 5,328,169 A | 7/1994 | Mandel |
(Continued)

FOREIGN PATENT DOCUMENTS

| AT | 502 332 A1 | 3/2007 |
| DE | 41 41 468 A1 | 6/1993 |
(Continued)

OTHER PUBLICATIONS

International Search Report of corresponding PCT/DE2016/000405, dated May 4, 2017, 3 pages.
(Continued)

*Primary Examiner* — Yolanda R Cumbess
(74) *Attorney, Agent, or Firm* — Lewis Roca Rothgerber Christie LLP

(57) ABSTRACT

Drawer device (501) having a surveillance space (R) for storing piece goods (G), the drawer device having a base (410) and four side walls (510), and having at least one separating element (330), which is inserted parallel to the side walls (510), such that at least two partial sections (TB) are created, wherein at least one partial section (TB) has, on at least two opposing sides, respectively, at least one sensor assembly (100) having a plurality of signal transmitting devices (21) and/or signal receiving devices (22), respectively one control electronics (16) for power supply, control and/or processing of signals (S), wherein a signal (S) of a signal transmitting device (21) of a sensor assembly (100) is detectable from a plurality of signal receiving devices (22) of the opposing sensor assembly (100), and the at least one separating element (330) is positionable approximately par-
(Continued)

Figure 1:
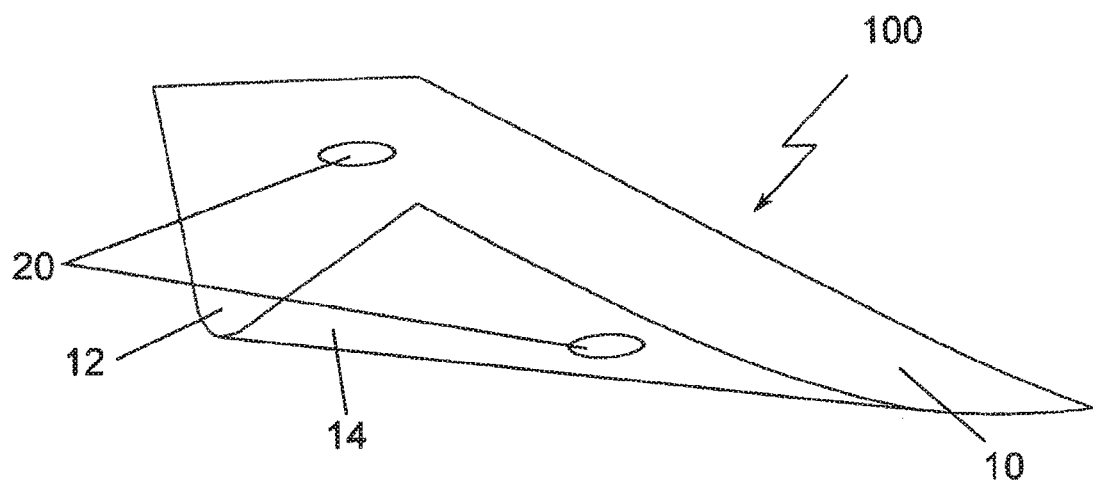

allel to a signal direction (S) between the signal transmitting devices and the signal receiving devices.

19 Claims, 22 Drawing Sheets

(51) Int. Cl.
| | |
|---|---|
| *G06Q 10/08* | (2012.01) |
| *A47B 88/969* | (2017.01) |
| *A47F 3/00* | (2006.01) |
| *B65G 1/04* | (2006.01) |
| *G05B 15/02* | (2006.01) |
| *A47F 5/16* | (2006.01) |
| *A47F 7/28* | (2006.01) |
| *B25H 3/02* | (2006.01) |
| *G06Q 30/06* | (2012.01) |

(52) U.S. Cl.
CPC ............... *A47F 7/28* (2013.01); *B25H 3/02* (2013.01); *B65G 1/04* (2013.01); *G05B 15/02* (2013.01); *G06Q 10/087* (2013.01); *A47F 2005/165* (2013.01); *A47F 2010/025* (2013.01); *G06Q 30/0633* (2013.01)

(56) References Cited

U.S. PATENT DOCUMENTS

| | | | |
|---|---|---|---|
| 5,745,366 A * | 4/1998 | Higham | ............ G07F 17/0092 |
| | | | 700/242 |
| 6,039,467 A | 3/2000 | Holmes | |
| 6,116,461 A | 9/2000 | Broadfield et al. | |
| 2005/0168345 A1 | 8/2005 | Swafford, Jr. et al. | |
| 2007/0030142 A1 * | 2/2007 | Gresset | ............ G08B 13/1427 |
| | | | 340/506 |
| 2008/0065264 A1 | 3/2008 | Omura et al. | |
| 2008/0103939 A1 | 5/2008 | Gibb | |
| 2009/0138122 A1 * | 5/2009 | Wagner | ................ A61G 12/001 |
| | | | 700/226 |
| 2012/0253510 A1 | 10/2012 | Thomas et al. | |
| 2014/0110584 A1 * | 4/2014 | Campbell | ................ G01J 1/42 |
| | | | 250/340 |
| 2014/0284239 A1 * | 9/2014 | Espinosa | ................ B65D 81/00 |
| | | | 206/459.5 |

FOREIGN PATENT DOCUMENTS

| | | |
|---|---|---|
| DE | 197 14 799 A1 | 10/1998 |
| DE | 10 2005 039 781 A1 | 7/2006 |
| DE | 10 2005 037 490 A1 | 2/2007 |
| DE | 10 2007 017 207 A1 | 2/2008 |
| EP | 1 752 795 A2 | 2/2007 |
| EP | 2 199 999 A1 | 6/2010 |
| EP | 2 312 919 A1 | 4/2011 |
| WO | WO 2008/001019 A2 | 1/2008 |
| WO | WO 2010/017530 A2 | 2/2010 |

OTHER PUBLICATIONS

English translation of Written Opinion of corresponding PCT/DE2016/000405, dated Apr. 18, 2017, 5 pages.
Search Report of corresponding DE 10 2015 120 000.7, dated Jul. 29, 2016, 9 pages.

* cited by examiner

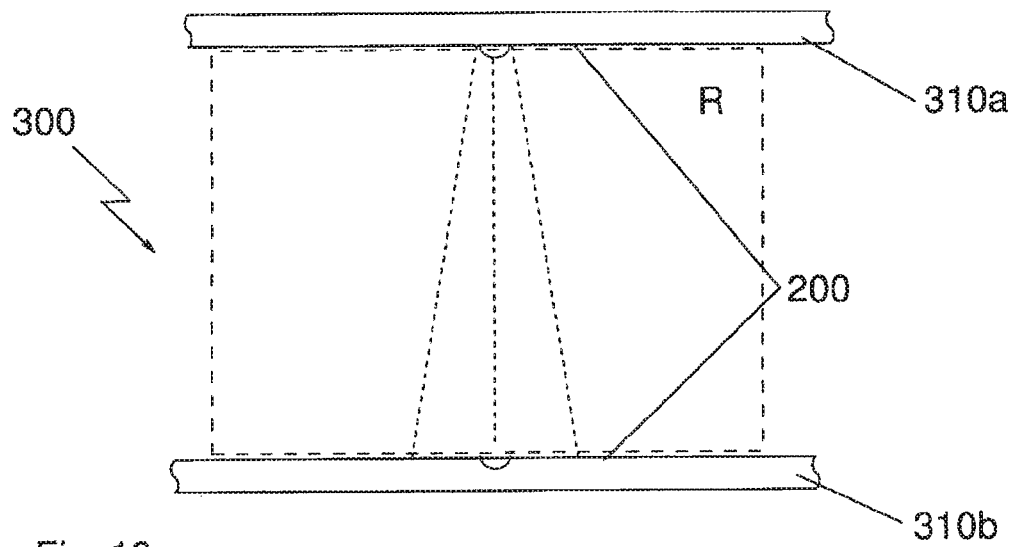
Fig. 18 a
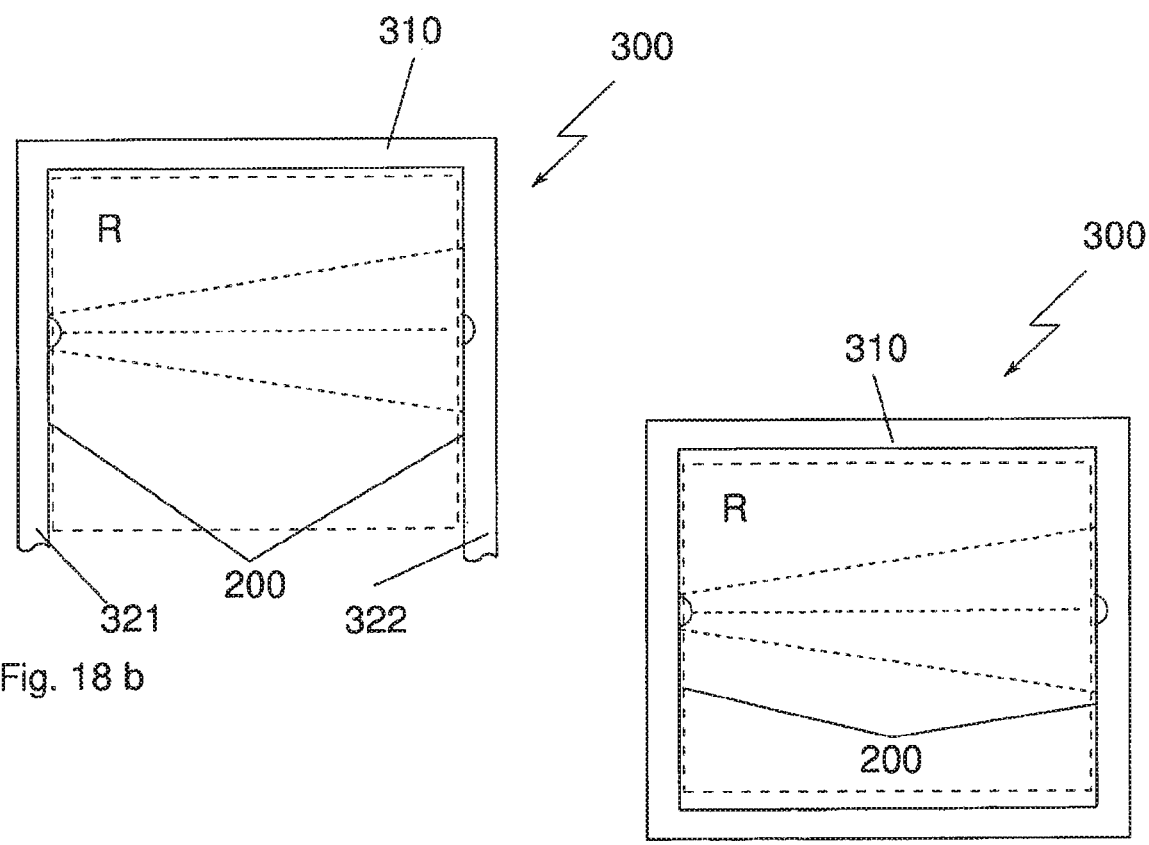
Fig. 18 b
Fig. 18 c

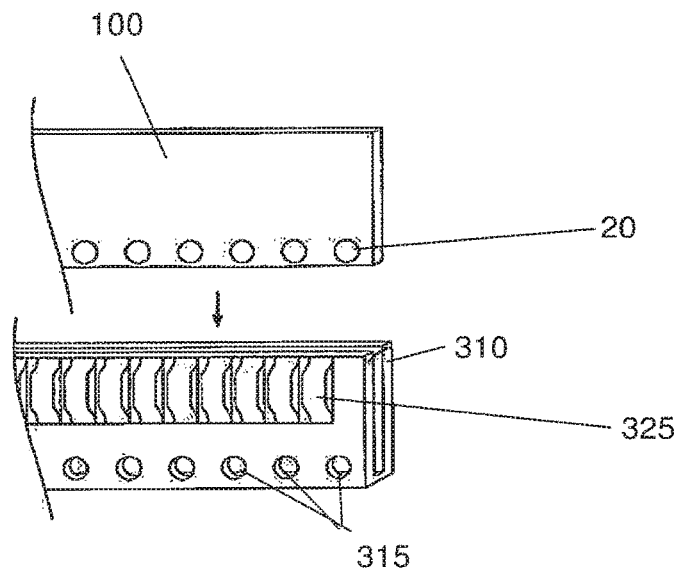
Fig. 28 a
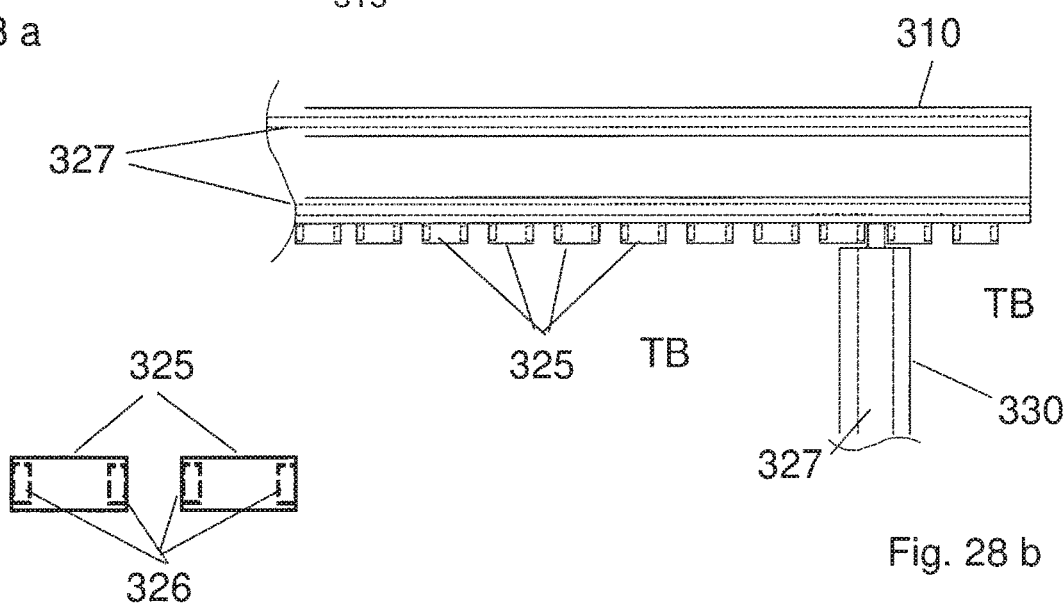
Fig. 28 c
Fig. 28 b
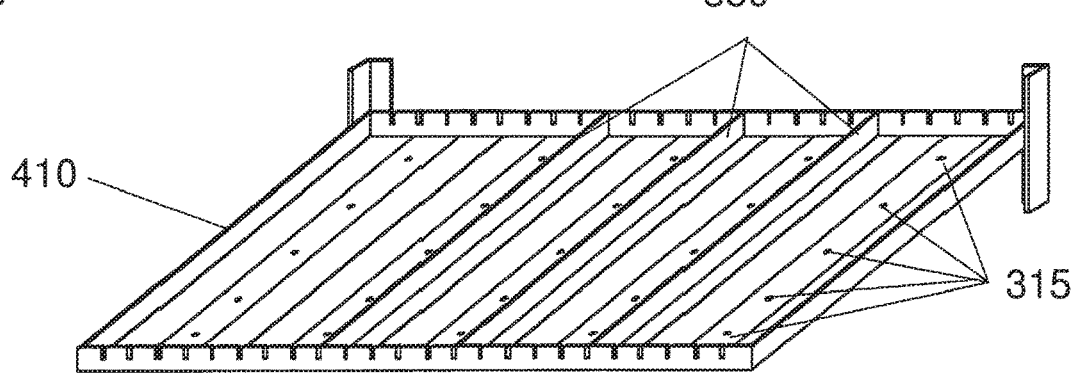
Fig. 29

DRAWER DEVICE FOR STORING PIECE GOOD, STORAGE DEVICE HAVING A DRAWER DEVICE, AND RELATED METHODS

This application is a national phase patent application derived from the international patent application no. PCT/DE2016/000405, and claims the benefit of the filing date of the German patent application no. DE 10 2015 120 000.7 filed on Nov. 18, 2015, the disclosures of which are hereby incorporated herein by reference.

FIELD OF THE INVENTION

The invention relates to a drawer device, a storage device having a drawer device, a method for initializing the storage device and a method for operating the storage device.

TECHNOLOGICAL BACKGROUND

In order to satisfy the requirements of a modern and thus sophisticated logistics, it is necessary nowadays to equip the storage devices used for this purpose intelligently and to integrate them in superordinate total systems.

Generally, some approaches for automated storage systems having automatic measuring devices are known already.

DE 10 2007 017 207 A1 describes a sensor for an occupancy recognition, and discloses a drawer having a standard part made of foam material and recesses for receiving tools. A sensor formed as a reflected-light barrier is located at the bottom of a recess. The sensor comprises a light emitter and a receiver located within very close distance. The emitted light is either reflected or not based on whether a tool is located in the recess. The receiver generates a signal only when a tool is present in the recess.

DE 197 14 799 C2 shows a device for storing units of goods, the device having a matrix of sensors and corresponding signal lines arranged at a bottom of a goods tray, and wherein the signal lines are formed by a conductor board strip in the area of the goods tray. On the goods tray, on which strip and the sensors are mounted, the sensors comprise pressure sensors, capacitive/inductive sensors, or mechanical switches.

A photocopying device is known from U.S. Pat. No. 5,328,169, which device ranges the generated copies in different compartments, which are arranged inclinedly one upon the other. Both a light emitting diode and a light sensor are arranged spaced at a distance from each other at a lower end of each compartment, wherein the light emitting diode, which is arranged under the respective compartment, irradiates through a hole in the respective compartment into the light sensor of the compartment arranged above. On the basis of the presence of a signal at the light emitting diode, an associated electronics recognizes, whether paper is arranged between the light emitting diode and the light sensor: If a signal is present, no paper is present in the compartment. If no signal is present, the light beam is interrupted and paper lies in the compartment. Due to the light emitting diode and the light sensor being arranged separately from each other in the height direction of the compartment, there results a relatively large design size. By the described arrangement, one can only determine, whether paper lies at the lower end of the respective compartment.

Disadvantages of these solutions are, generally, the use of sensors functioning vertically and a greater space requirement for their use.

SUMMARY OF THE INVENTION

This invention provides a space-saving storage device for storing piece goods that can be easily and variably divided into compartments. The invention also provides a method for operating the space-saving storage device, so that the presence of piece goods can be easily detected.

According to an embodiment example of the invention, there is provided a drawer device having a surveillance space for storing piece goods. The drawer device has a base and four side walls and has at least one separating element, which is inserted parallel to the side walls, such that at least two partial sections are created, wherein at least one partial section has, on at least two opposing sides, respectively, at least one sensor assembly having a plurality of signal transmitting devices and/or signal receiving devices, respectively one control electronics for power supply, control and/or processing of signals. A signal of a signal transmitting device of a sensor assembly is detectable by a plurality of signal receiving devices of the opposing sensor assembly, and the at least one separating element is positionable approximately parallel to a signal direction between the signal transmitting devices and the signal receiving devices.

It is preferred that only signal transmitting devices (or signal transmitters) or signal receiving devices (or signal receivers) may be arranged, respectively, on an outer surface of a sensor assembly.

It is advantageous that an adhesion surface may be arranged on the non-fitted (or unpopulated) back side of the sensor assembly.

It is also possible that signal transmitting devices may be arranged on an outer surface of a sensor assembly, and signal receiving devices may be arranged on the opposite outer surface.

It is proposed that at least one sensor assembly may be integrated on at least one side of the partial section in a side wall (or lateral wall), and/or in a separating element, on the basis (or by the help) of a recess (or cavity).

It is advantageous that the recess may have an insertion opening for inserting a sensor assembly.

It is proposed that signal openings for conveying (or conducting) the signals may be provided in the side wall and/or in the separating element.

It is further proposed that at least one side wall and/or at least one separating element may have fixing devices for plugging-in separating elements.

It is advantageous that the fixing devices may provide contacts for an electrical connection of a plugged-in separating element for power supply as well as for conveying control signals and/or data signals to the, or from the, sensor assemblies.

According to an embodiment example of the invention, there is provided a storage device having at least one drawer device as described above. In the storage device, a data bus system for transmitting the control signals for at least one sensor assembly, the signals of the sensor assembly, and a power supply for the at least one sensor assembly are provided.

Further, it is advantageous that a data bus system for conveying the control signals for at least one sensor assembly, the signals of the sensor assembly, and a power supply for the at least one sensor assembly may be provided.

It is proposed that the drawer device may have a drawer plug connector, which may connect the drawer device in a closed state to the power supply and the data bus.

It is advantageous that a control unit for receiving, processing and outputting control signals via the data bus from, and/or to, the sensor assemblies may be provided.

Preferably, a sensor assembly may be distinctly (or uniquely) identifiable with respect to other sensor assemblies.

Further, it is proposed that all sensor assemblies may be managed in the control unit, such that pair-wisely co-operating sensor assemblies, groups of pair-wisely co-operating signal transmitting devices and signal receiving devices, or at least individually pair-wisely co-operating signal transmitting devices and signal receiving devices may be storable and readable again, and can be controlled individually for an outputting or an inquiring of signals.

It is preferred that, in the control unit, an assignment (or a correlation) may be effected between the pair-wisely co-operating sensor assemblies, the groups of pair-wisely co-operating signal transmitting devices and signal receiving devices, and/or at least individually pair-wisely co-operating signal transmitting devices and signal receiving devices and the drawer and/or the surveillance space (or monitored area) or the partial section (or partial area, or sub-section).

It is advantageous that in the control unit an assignment (or a correlation) between at least one surveillance space or at least one partial section and the stored piece goods can occur to determine and update inventory.

Preferred may be the embodiments of the storage device as a shelf unit, a cupboard, a tool and gear wagon (or a mobile workshop), or a mobile filing pedestal (or mobile file cabinet).

According to an embodiment example of the invention, there is provided a method for initializing a storing device as described above. The method has the following steps:
  a. opening the at least one drawer device;
  b. if a piece good is detected inside the drawer device, removing the piece good;
  c. switching the control unit into an initialization mode;
  d. inserting at least one separating element for forming at least two empty partial sections;
  e. closing the drawer device;
  f. detecting the at least one inserted separating element;
  g. storing the position of the at least one separating element;
  h. on the system side, mapping logical partial sections for the storing of piece goods;
  i. assigning the pair-wisely co-operating signal transmitting devices and signal receiving devices to a storage space and/or a partial section;
  j. switching off the initialization mode, and storing the detected data.

This invention proposes a method for detecting at least one inserted separating element by switching on and off the signal transmitting devices in a stepwise manner. The signal transmitting devices may be arranged on the front side (or face side) of the separating element, and can output signals that are evaluated by signal receiving devices. The signal transmitting devices are located such that an output signal may be received by signal receiving devices without hindrance by a separating element. Plural signal receiving devices may be arranged beside each other, and are arranged opposite to the signal transmitting devices, so that when a separating element is present, a maximal signal may be received.

The signal receiving device(s), are arranged to directly oppose and/or abut the separating element, such that a sharp boundary of a separating element may be detected when signals that are sent by the transmitting device(s), are not received by the signal receiving devices.

According to an embodiment example of the invention, there is provided a method for operating a storing device as described above. The method has the following steps:
  a. opening the at least one drawer device;
  b. storing or withdrawing piece goods;
  c. closing the drawer device;
  d. performing an occupancy recognition in the surveillance space or at least in the partial section;
  e. detecting an inventory of piece goods and, if necessary, updating the inventory;
  f. when falling below a minimum quantity, if necessary, triggering a reorder transaction.

It is advantageous that the performing of the occupancy recognition may be effected by activating the signal transmitting devices associated to a surveillance space or to a partial section and inquiring the signal receiving devices, in that a received signal may be interpreted as a missing piece good, and a non-received signal or an only very weak signal may be interpreted as a piece good being present.

Further, it is advantageous that the performing of the occupancy recognition may be triggered by switching a drawer device switch upon closing the drawer device.

Further features, details and advantages of the invention follow from the claims of protection, the wording of which is made contents of the description by reference. The features, which are mentioned above and which are still to be explained in the following, are usable not only in the respectively indicated combination, but also in other combinations or in an island position (or taken alone), without leaving the framework of the present invention. Embodiments and examples of the invention are represented in the drawings and are explained in more detail in the following description.

SHORT DESCRIPTION OF THE DRAWINGS

Figure 2:
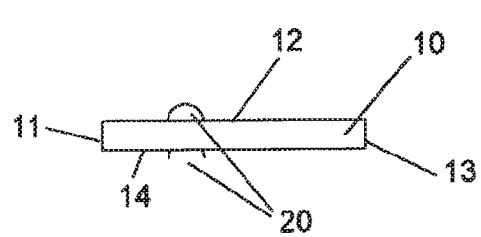
Figure 2:
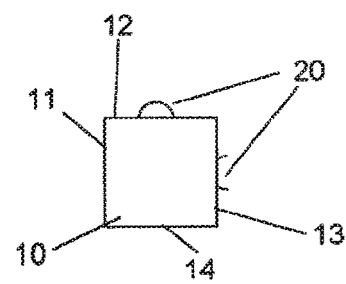
Figure 2:
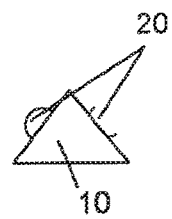
Figure 2:
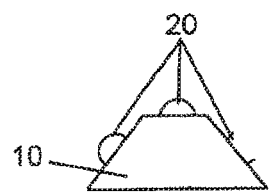
Figure 3:
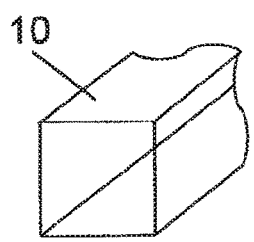
Figure 3:
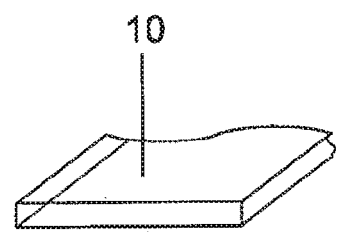
Figure 3:
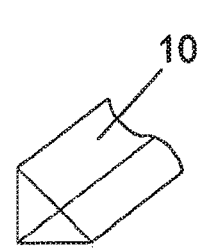
Figure 4A:
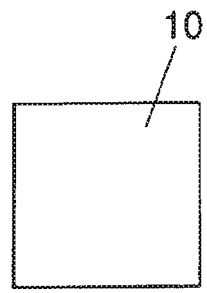
Figure 4B:
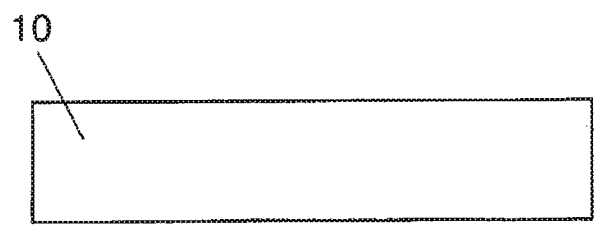
Figure 4C:
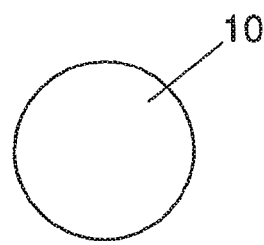
Figure 4D:
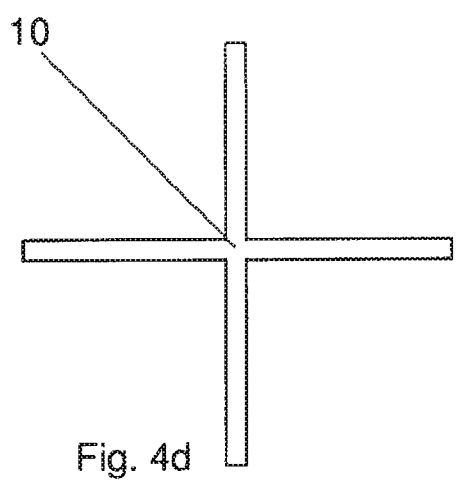
Figure 4E:
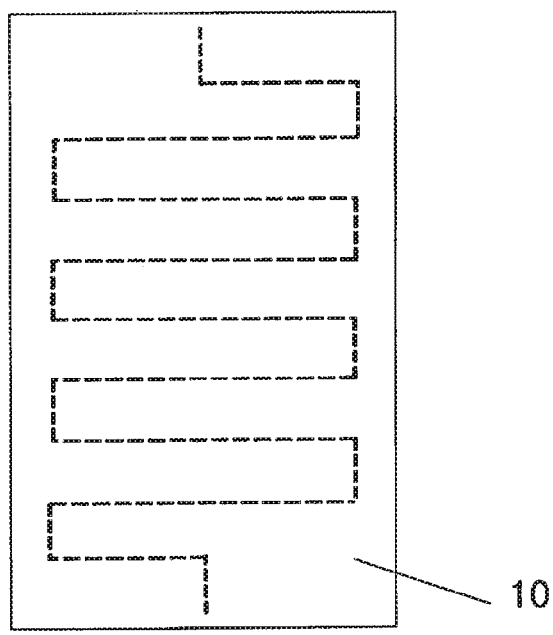
Figure 5:
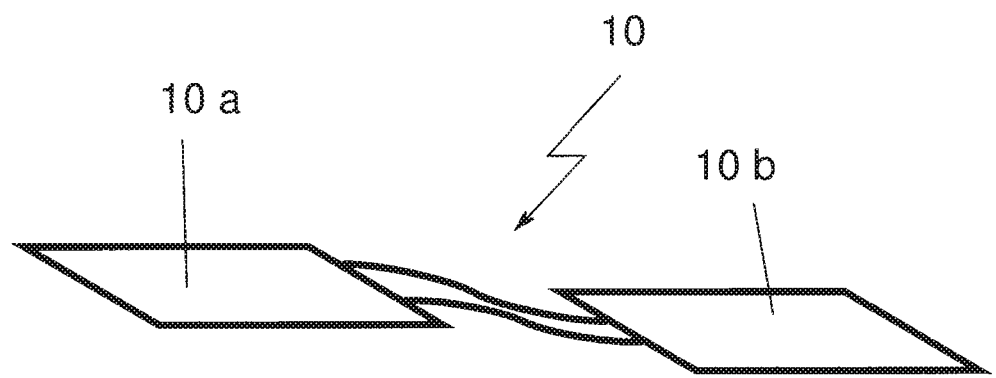
Figure 6:
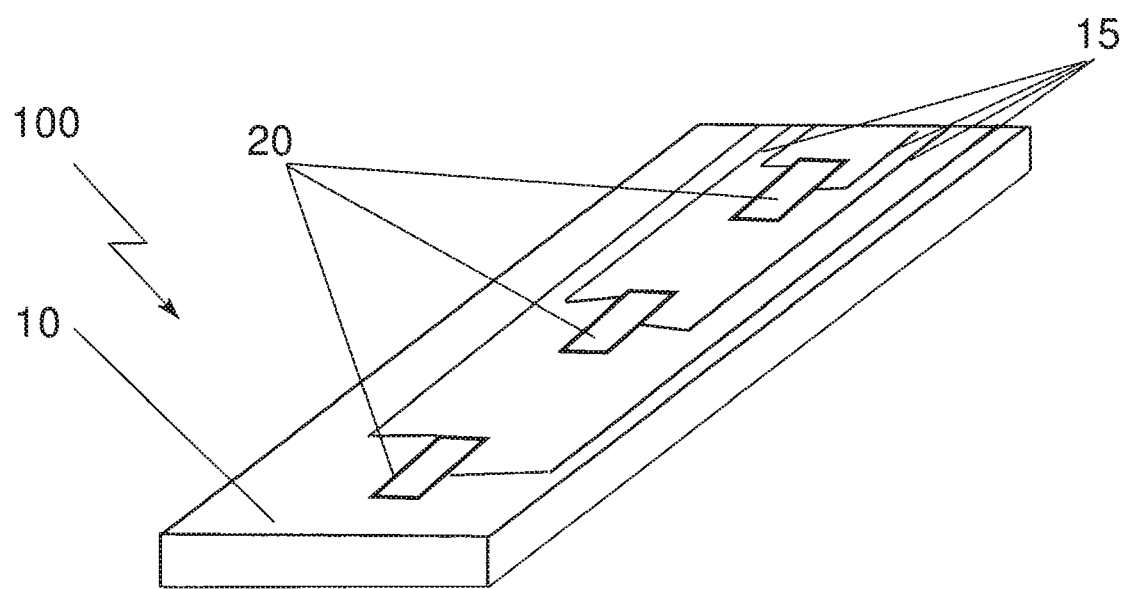
Figure 7:
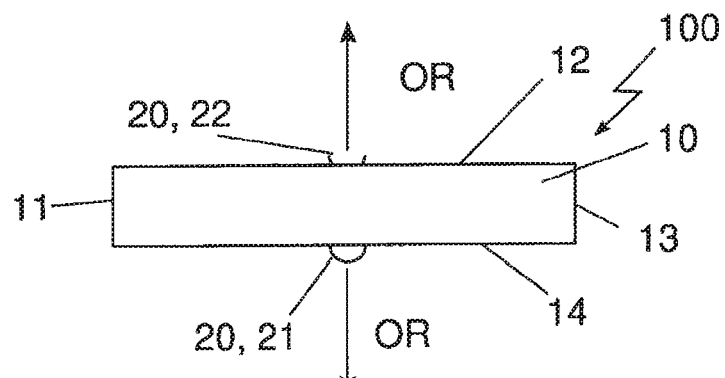
Figure 8:
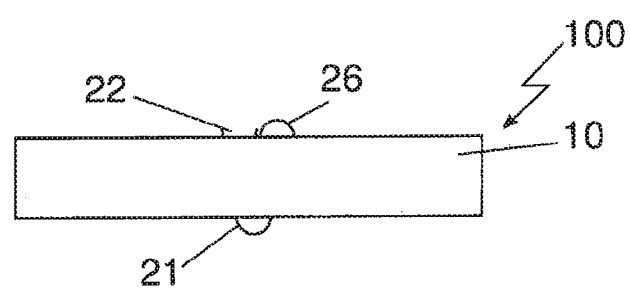
Figure 9:
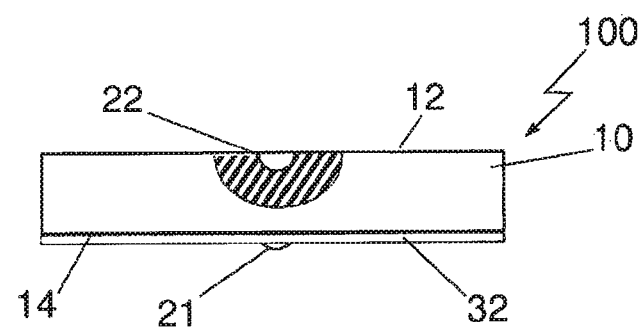
Figure 10:
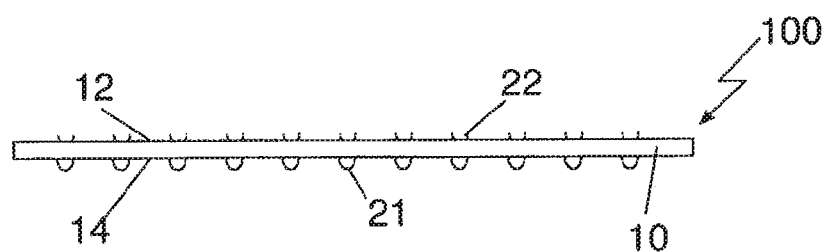
Figure 11:
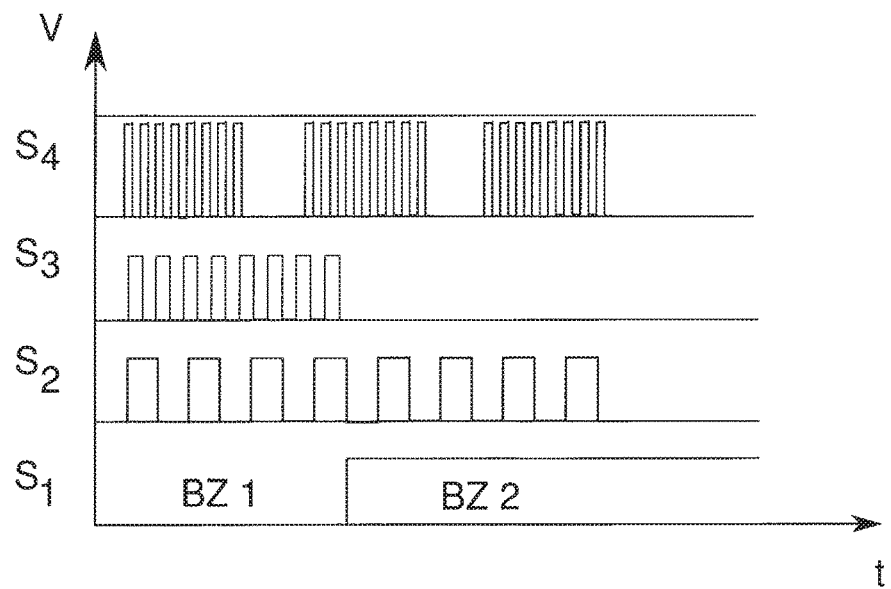
Figure 12:
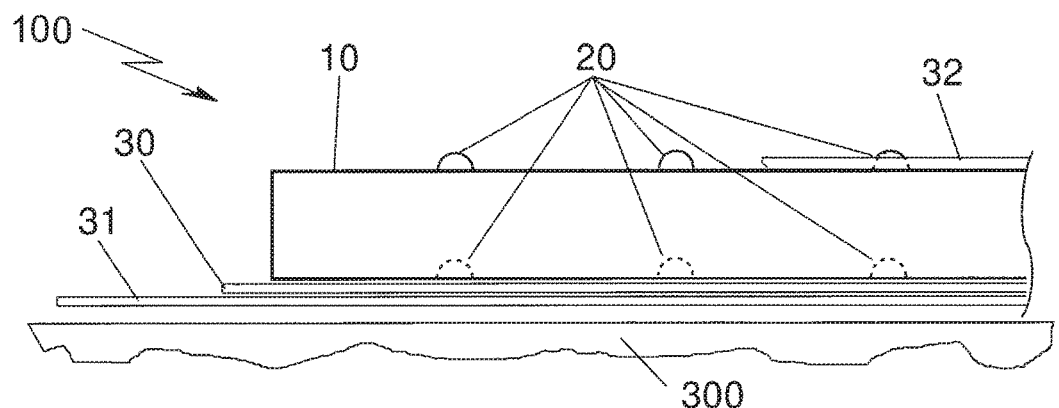
Figure 13:
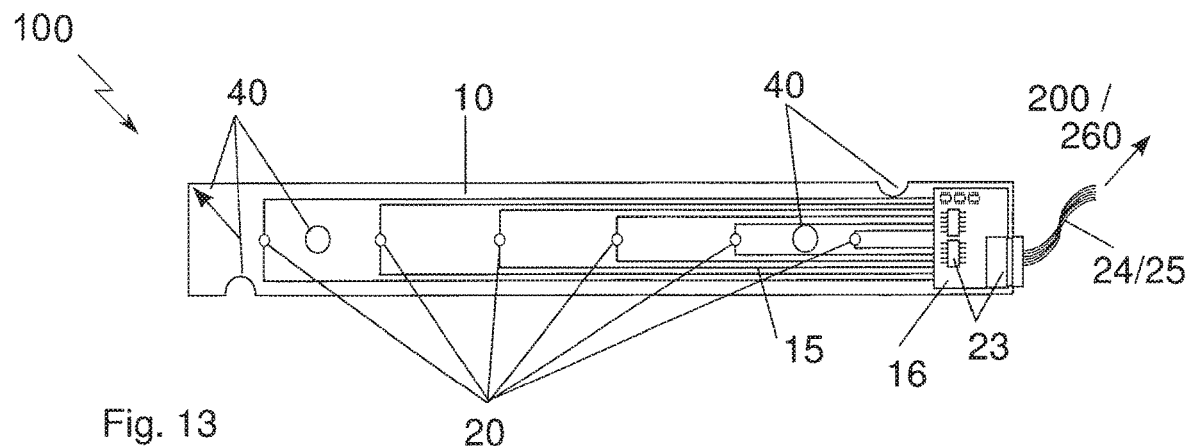
Figure 14:
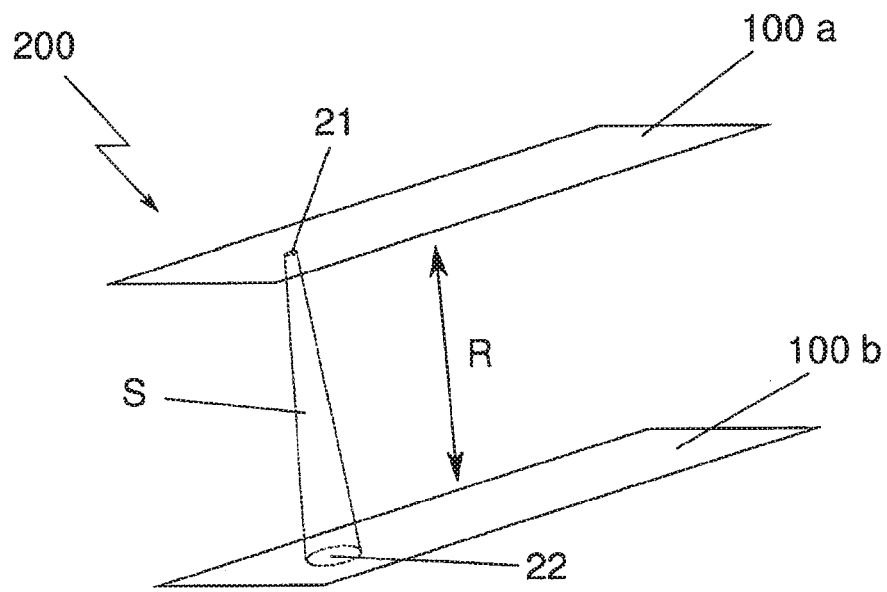
Figure 14:
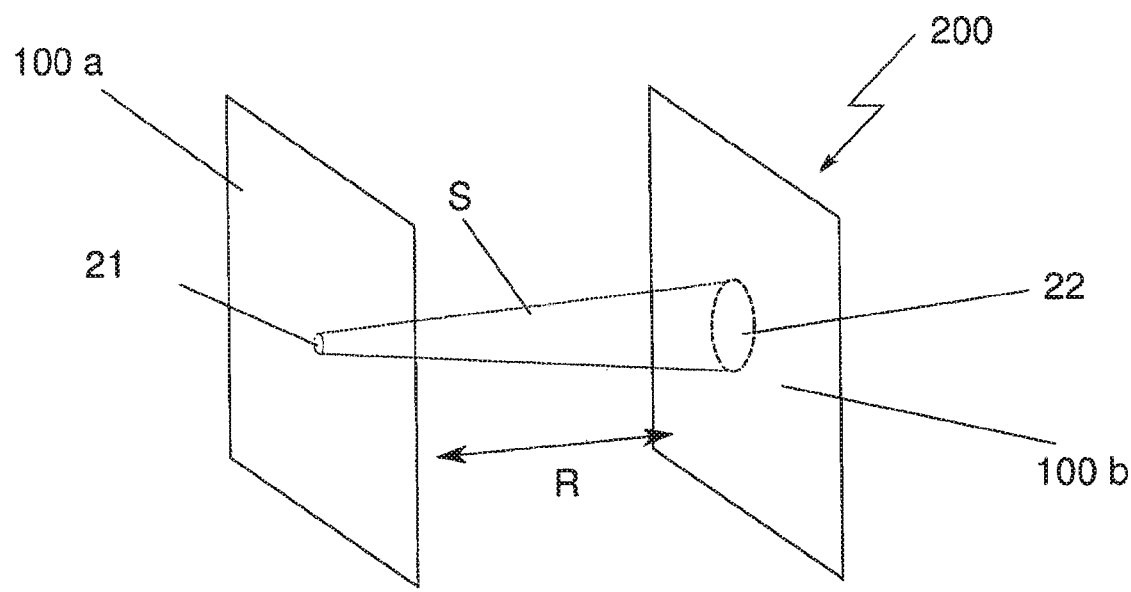
Figure 15:
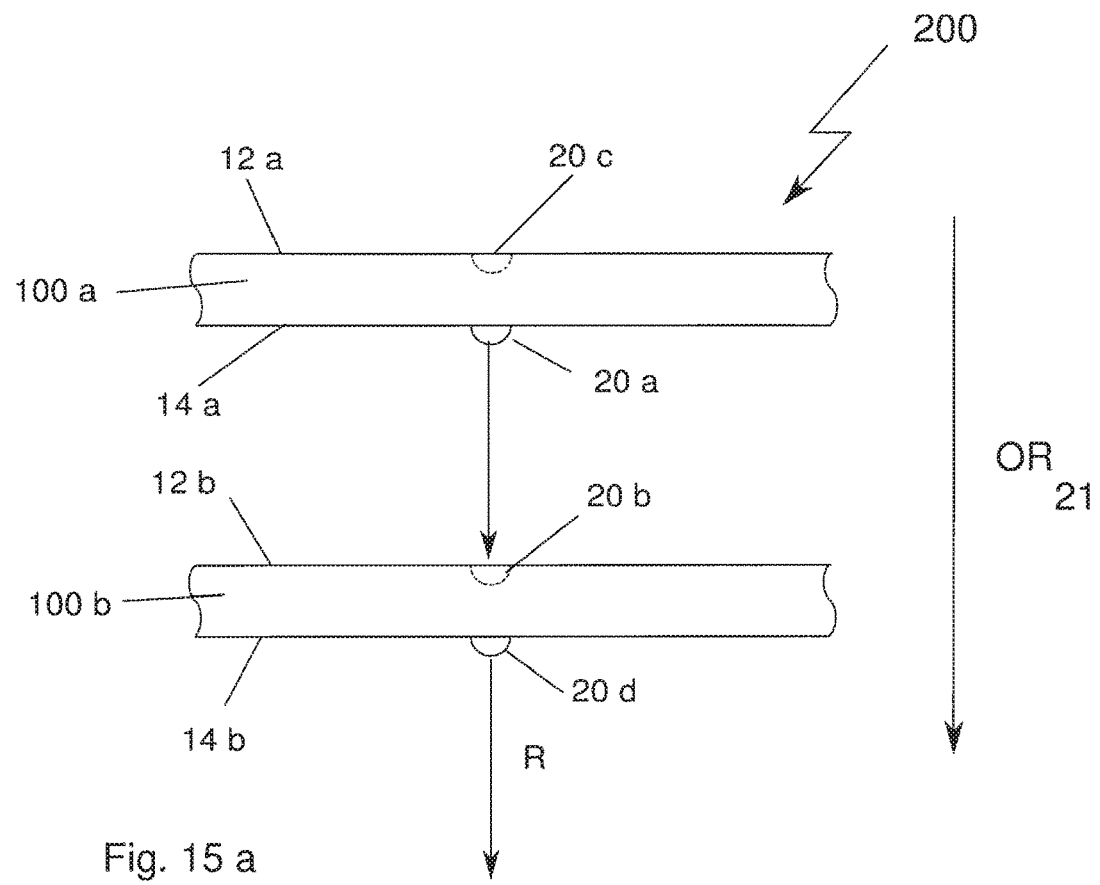
Figure 15:
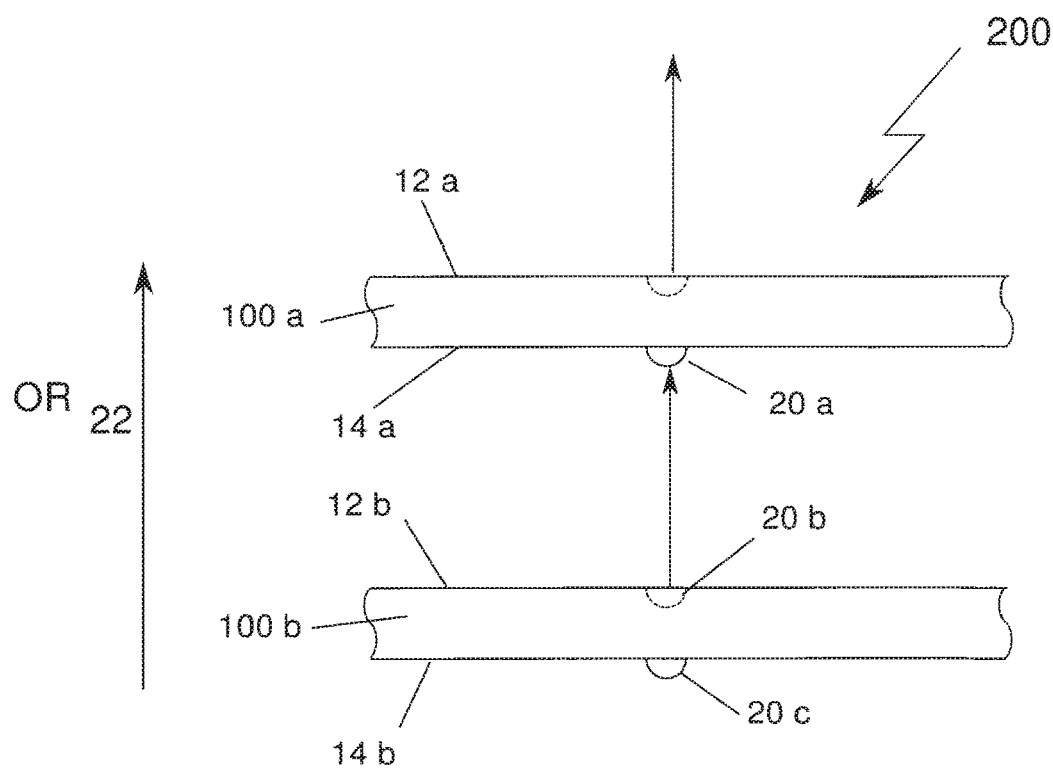
Figure 16:
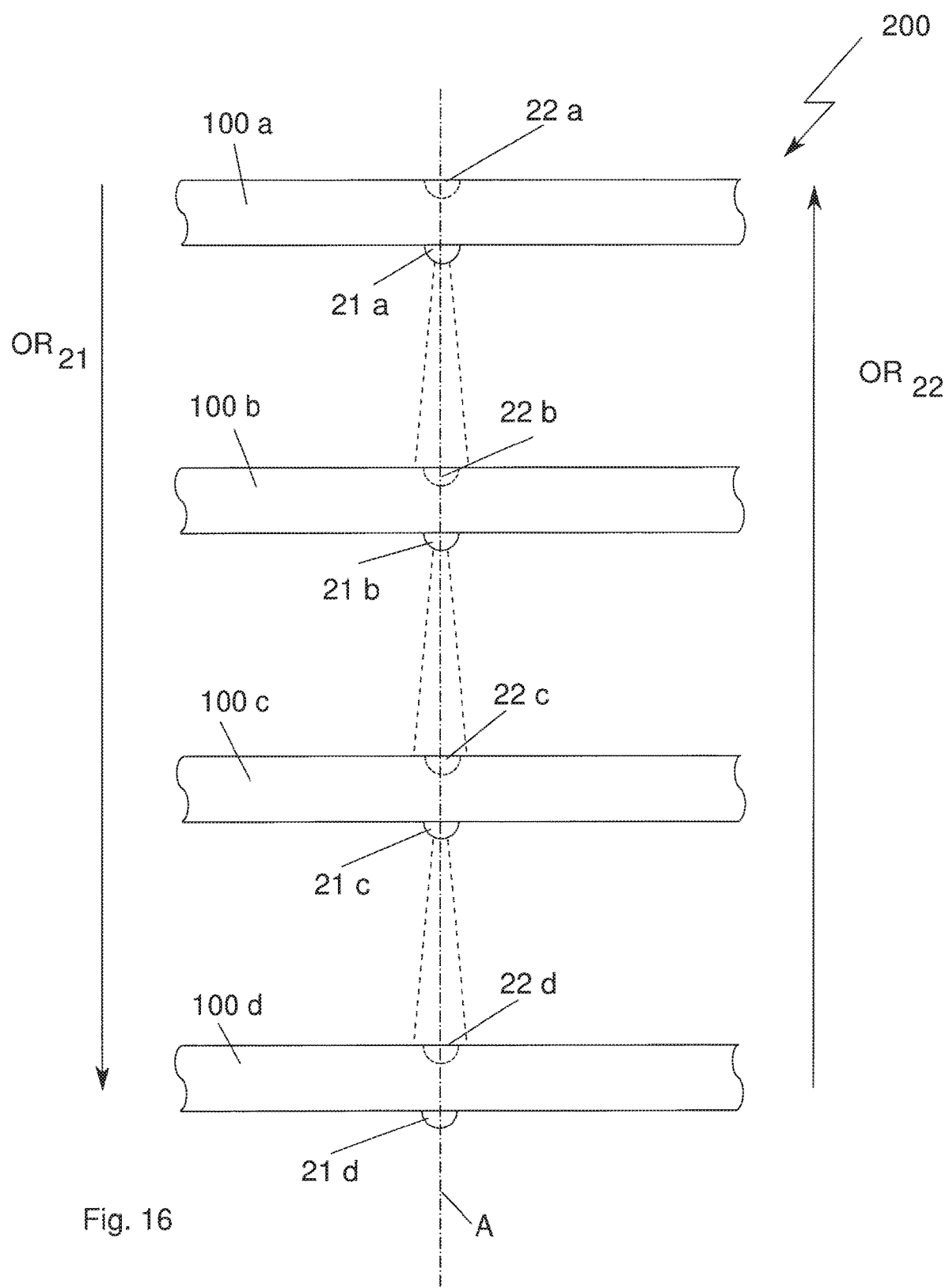
Figure 17:
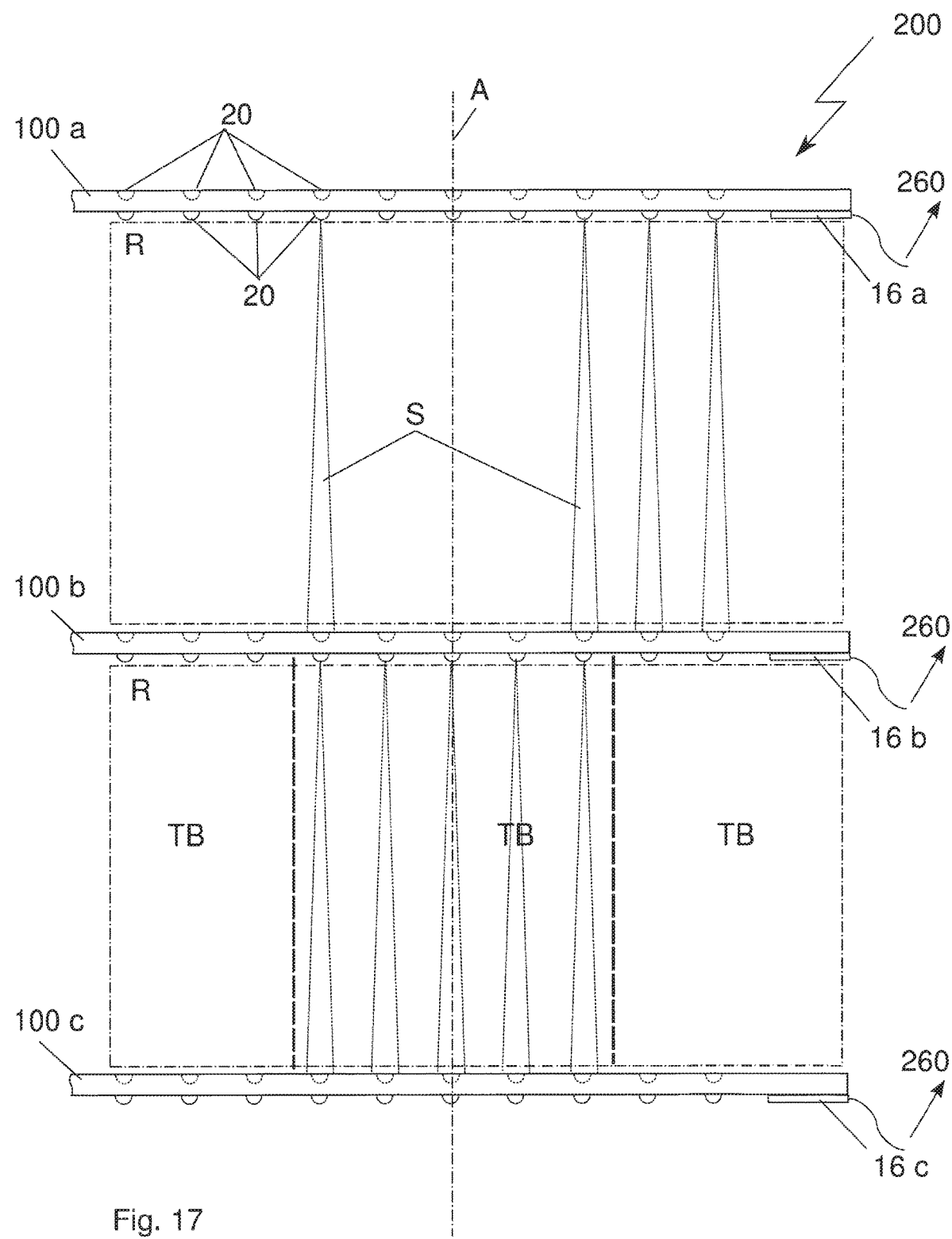
Figure 19:
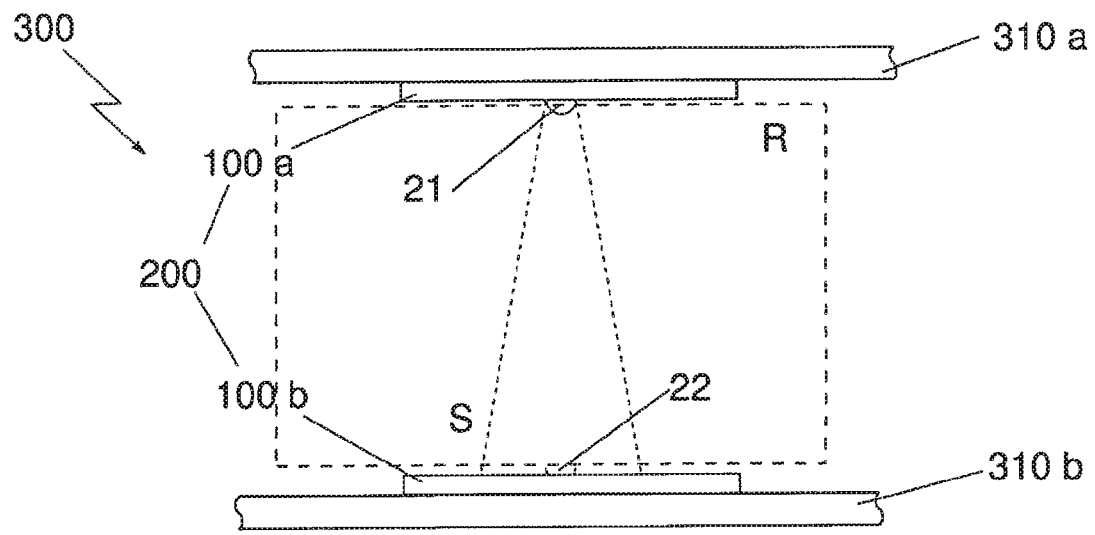
Figure 19:
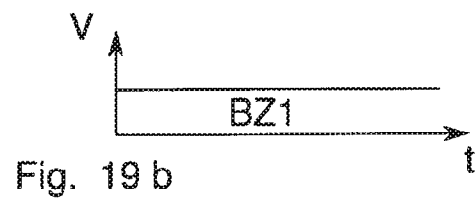
Figure 19:
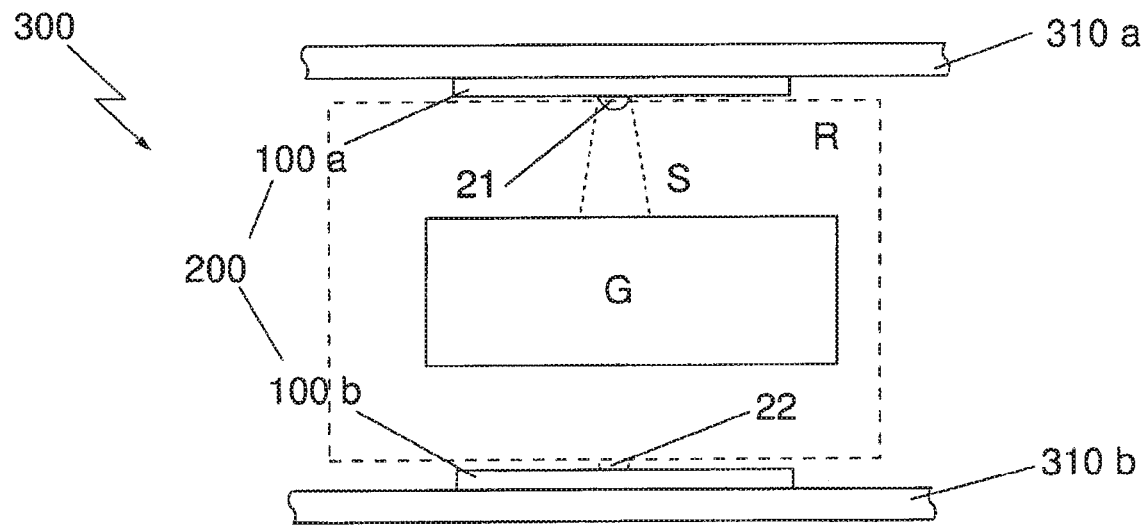
Figure 19:
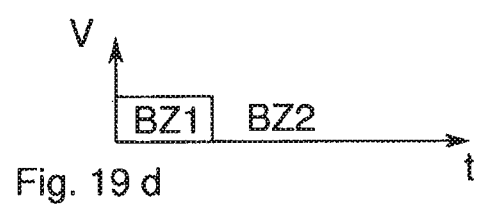
Figure 20:
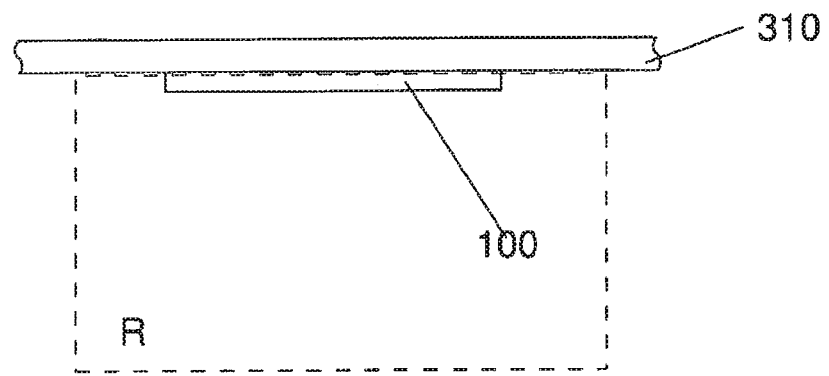
Figure 20:
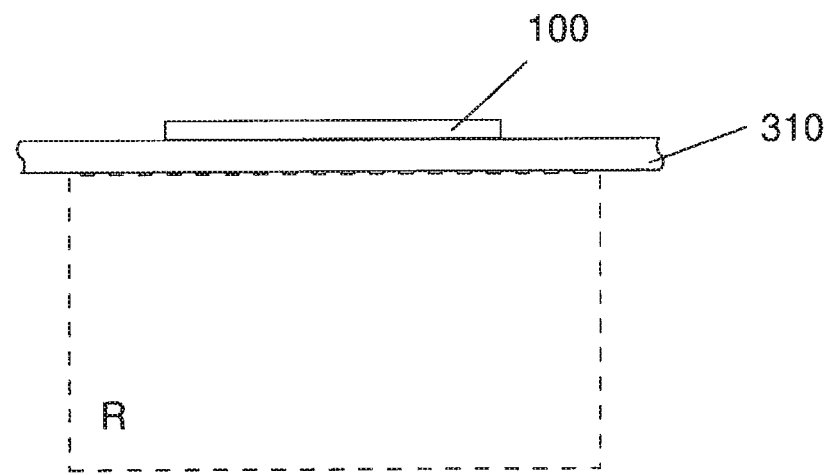
Figure 20:
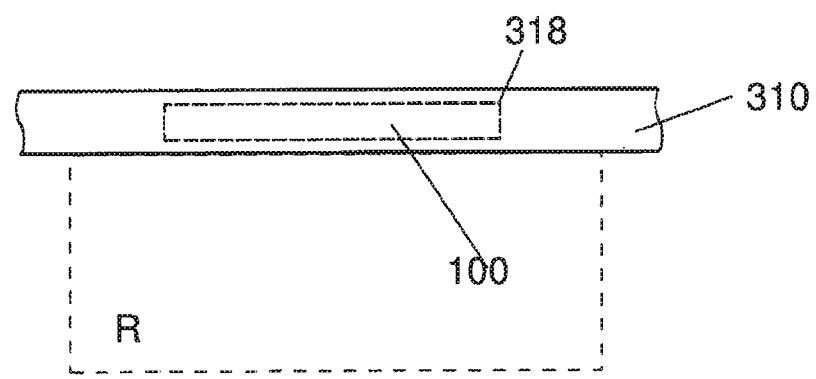
Figure 21:
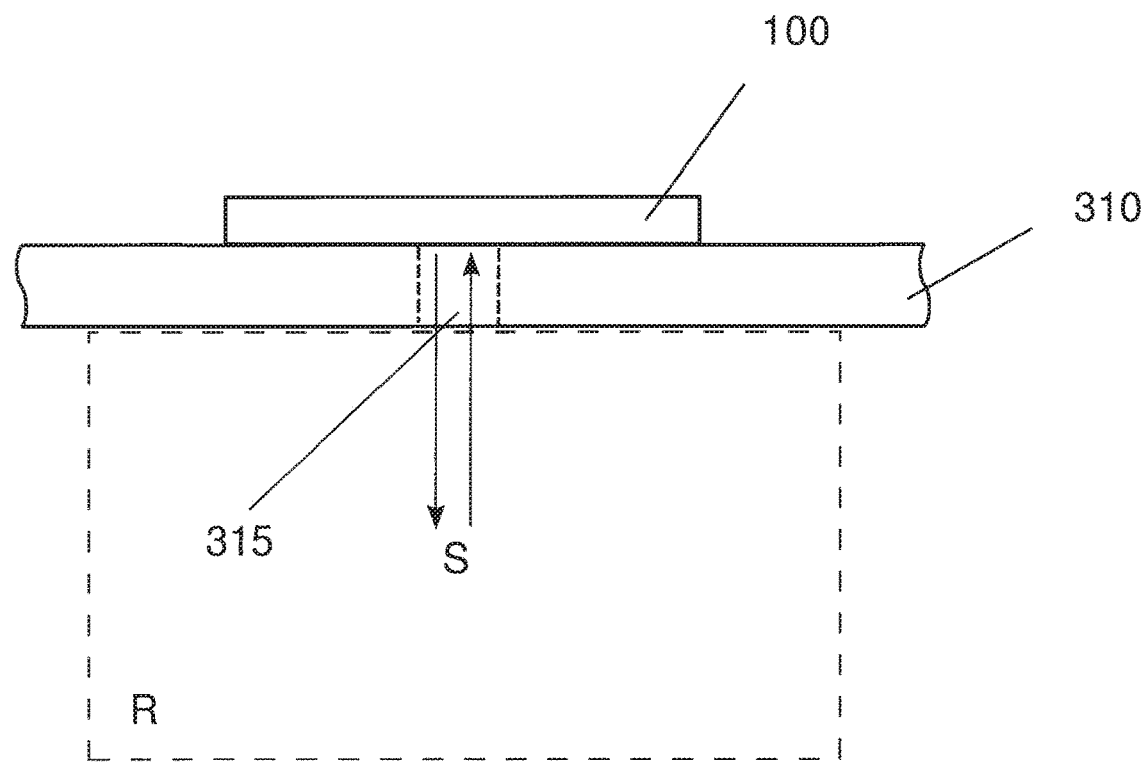
Figure 21:
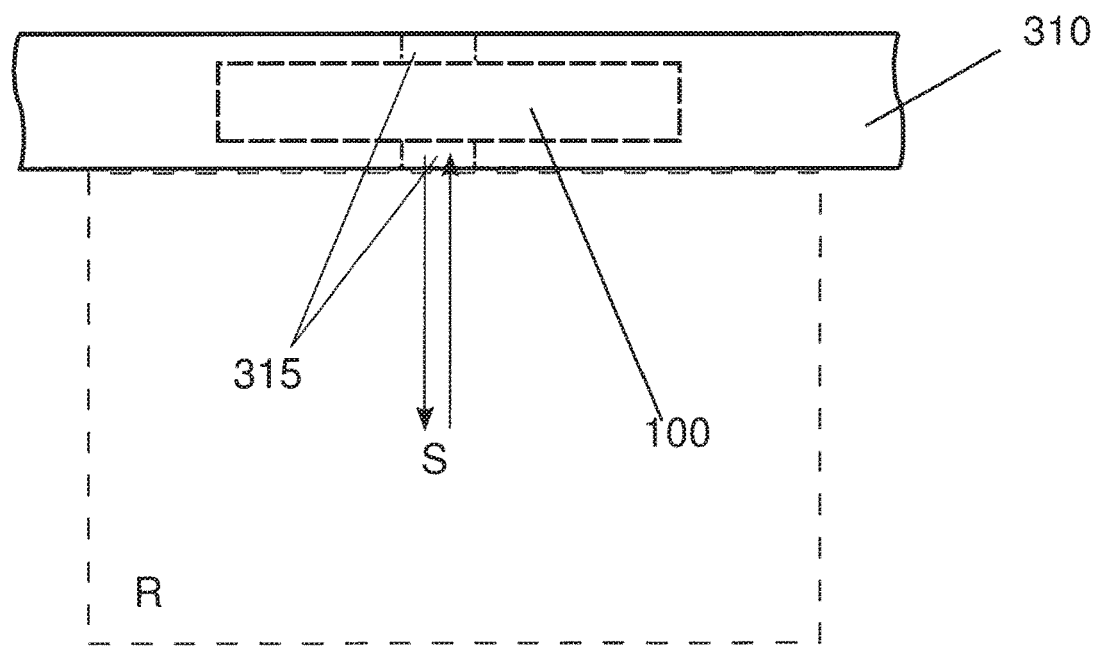
Figure 22:
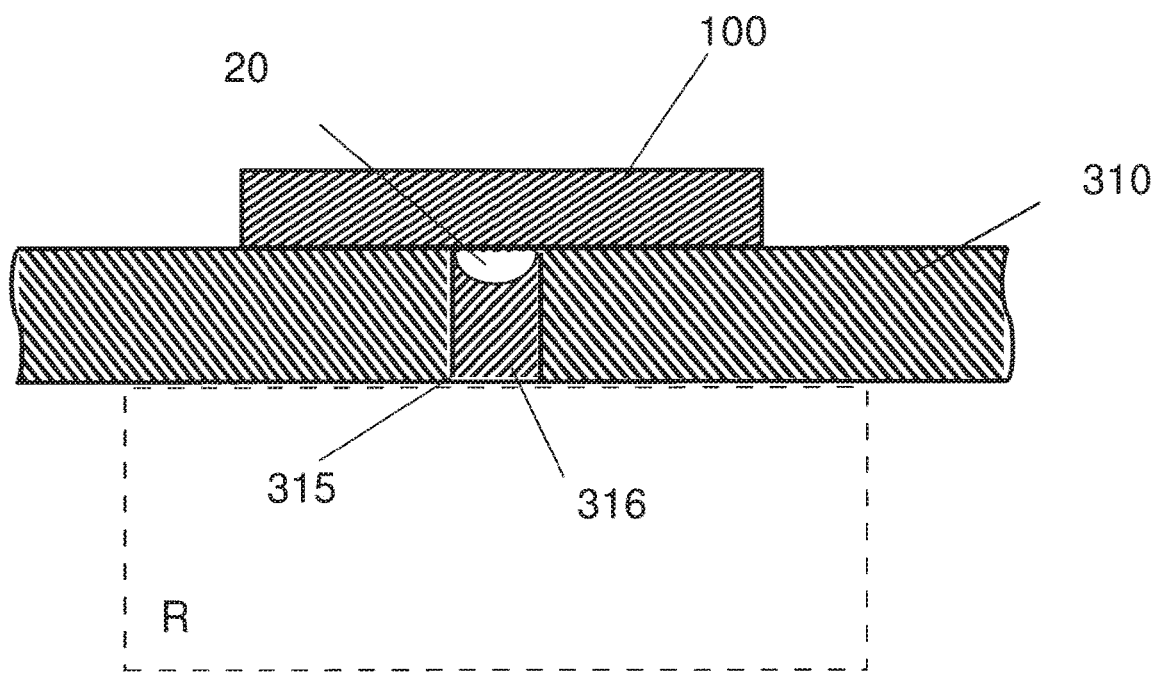
Figure 22:
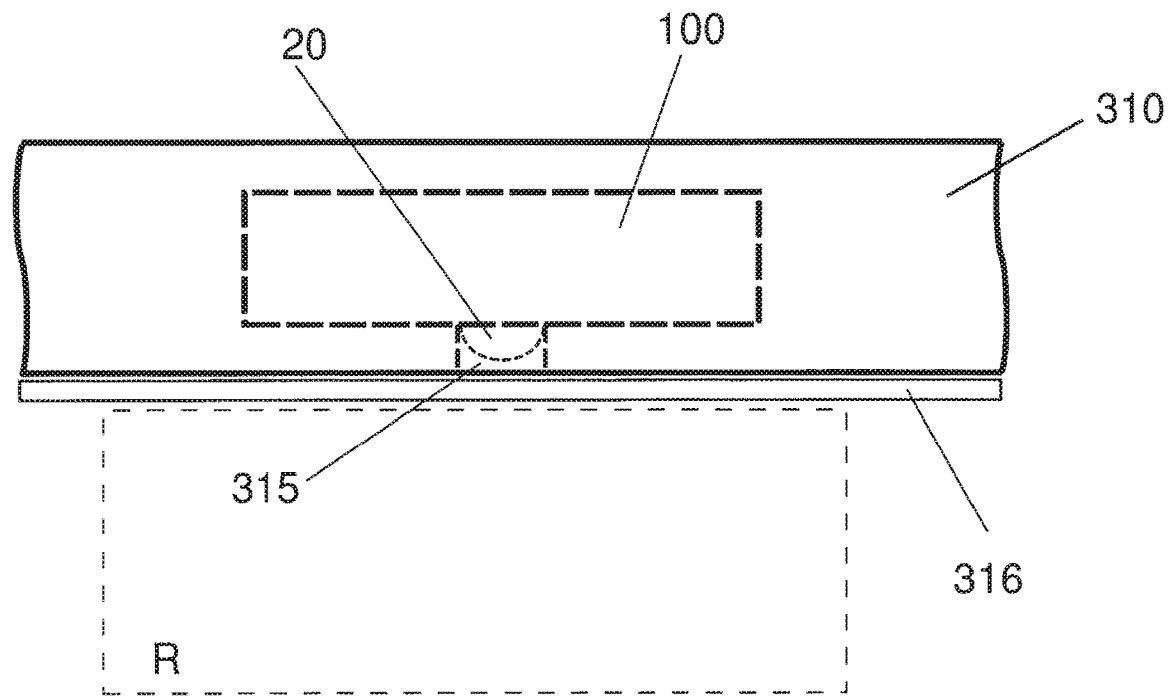
Figure 23:
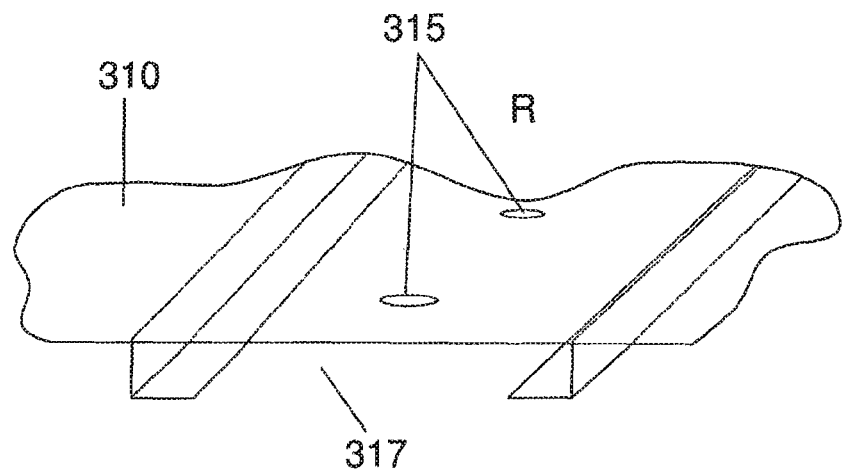
Figure 23:
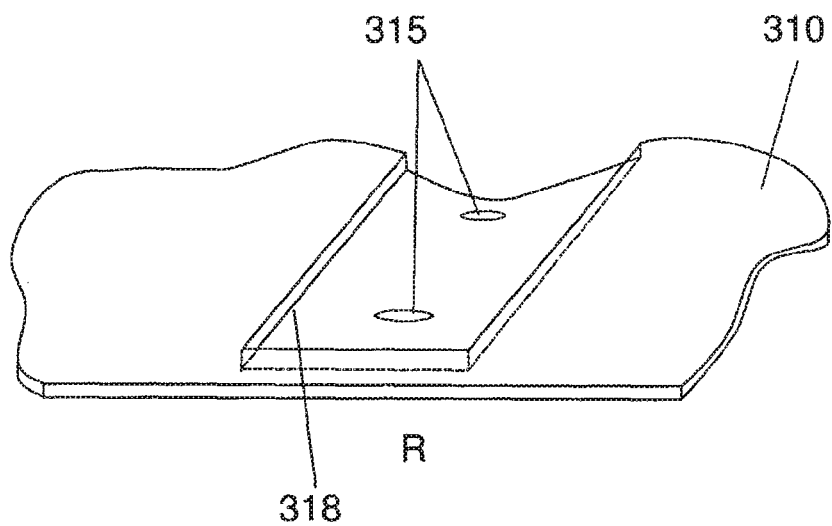
Figure 24:
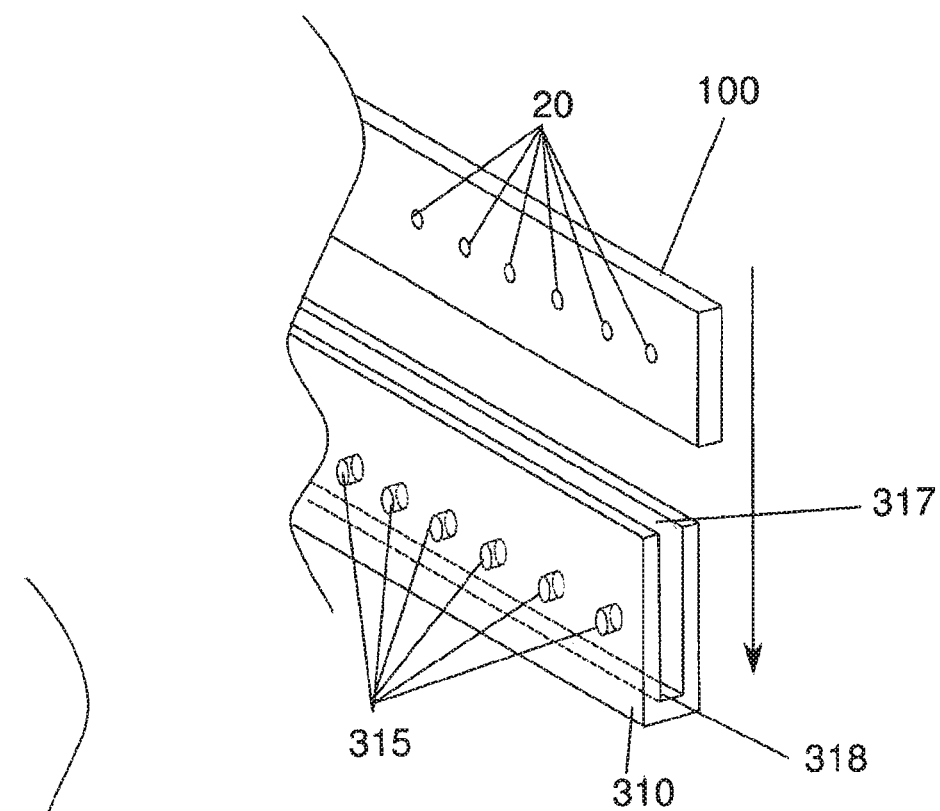
Figure 24:
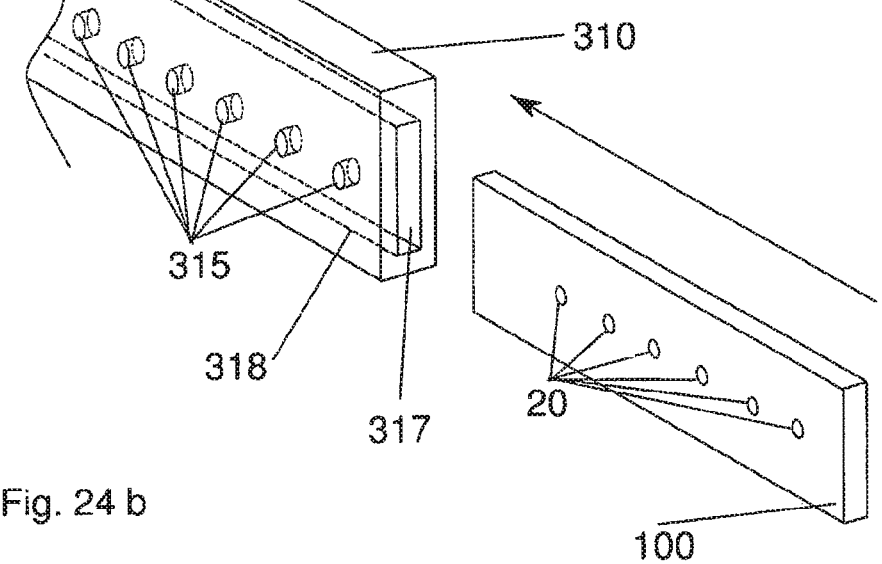
Figure 25:
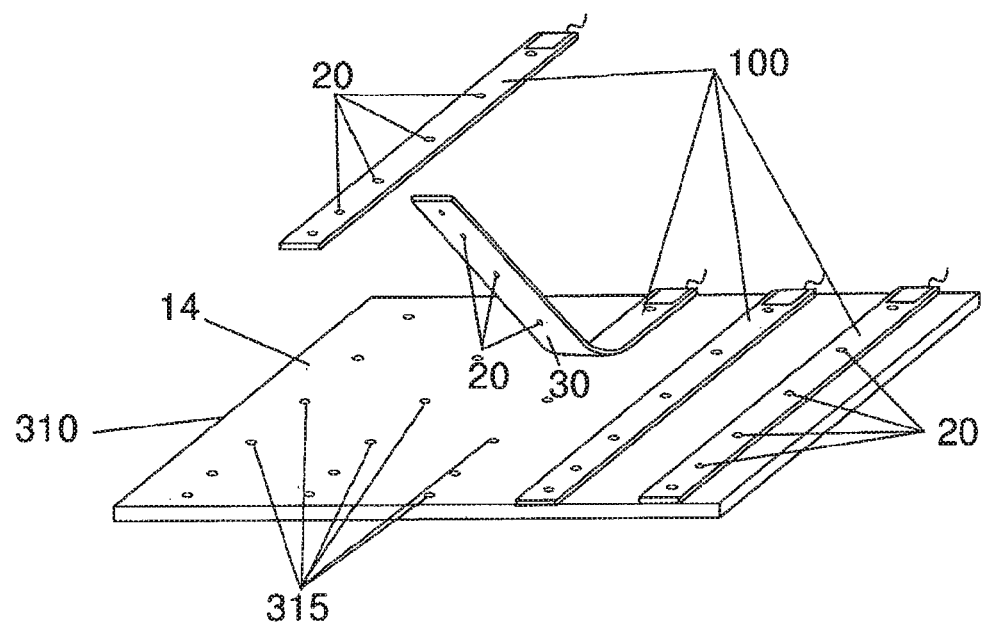
Figure 26:
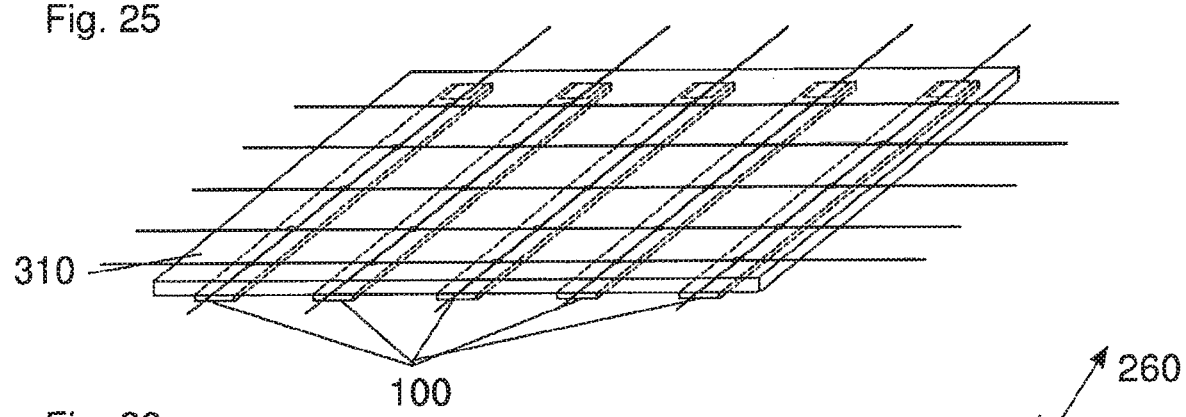
Figure 27:
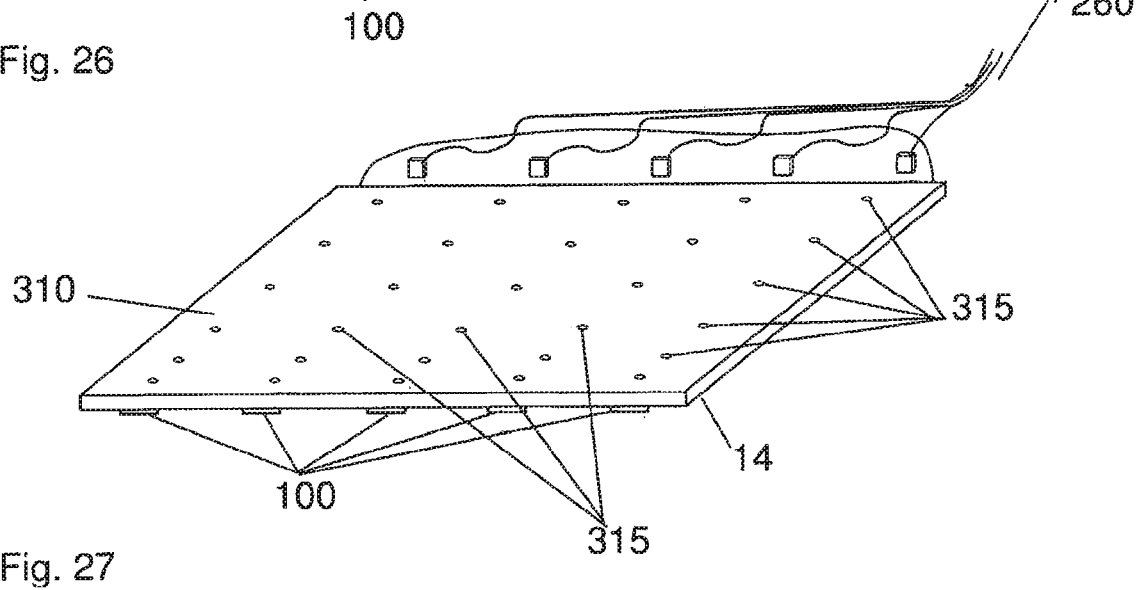
Figure 30:
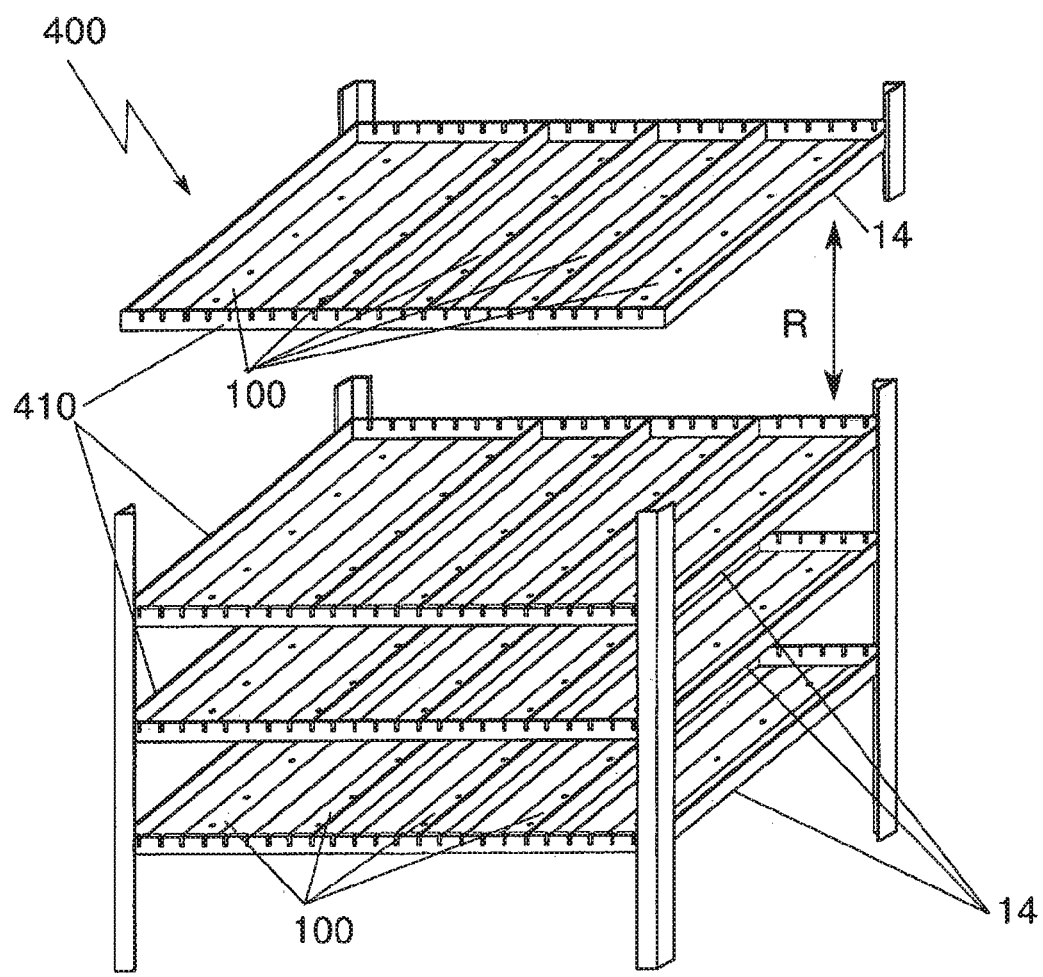
Figure 31:
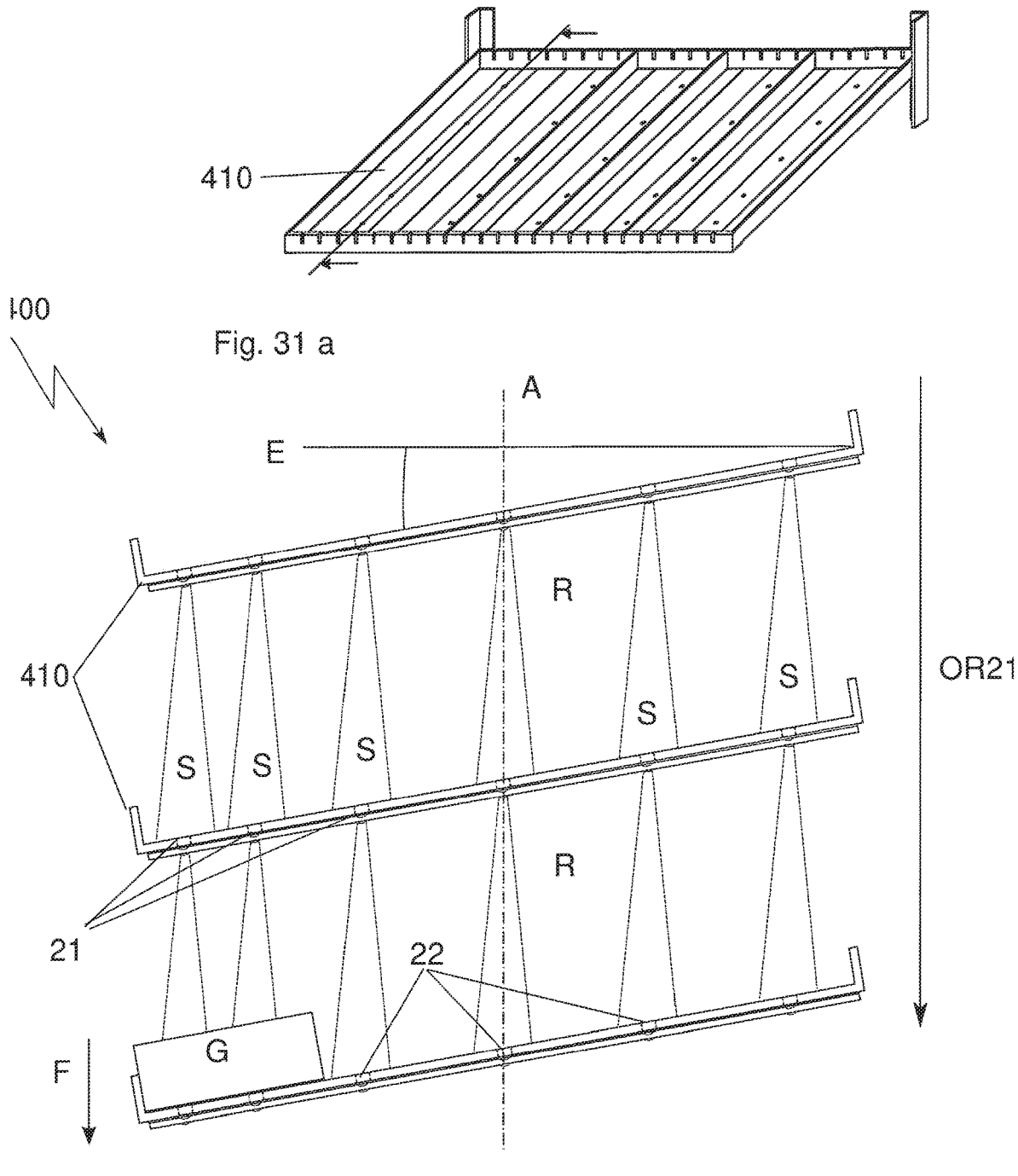
Figure 32:
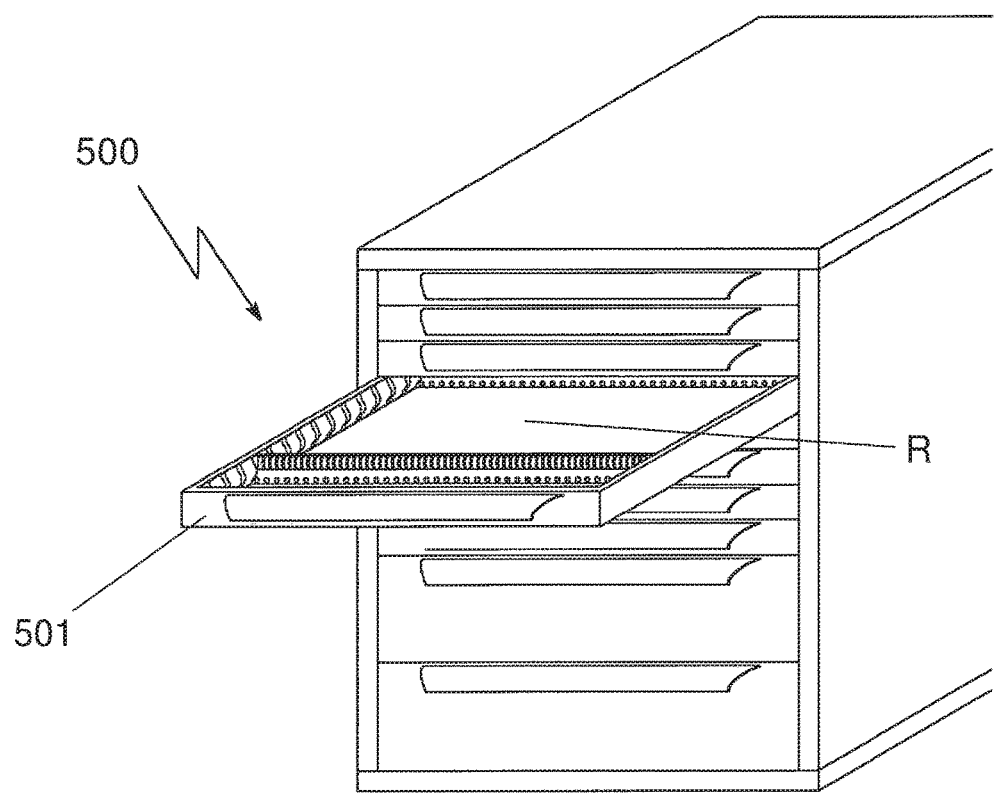
Figure 33:
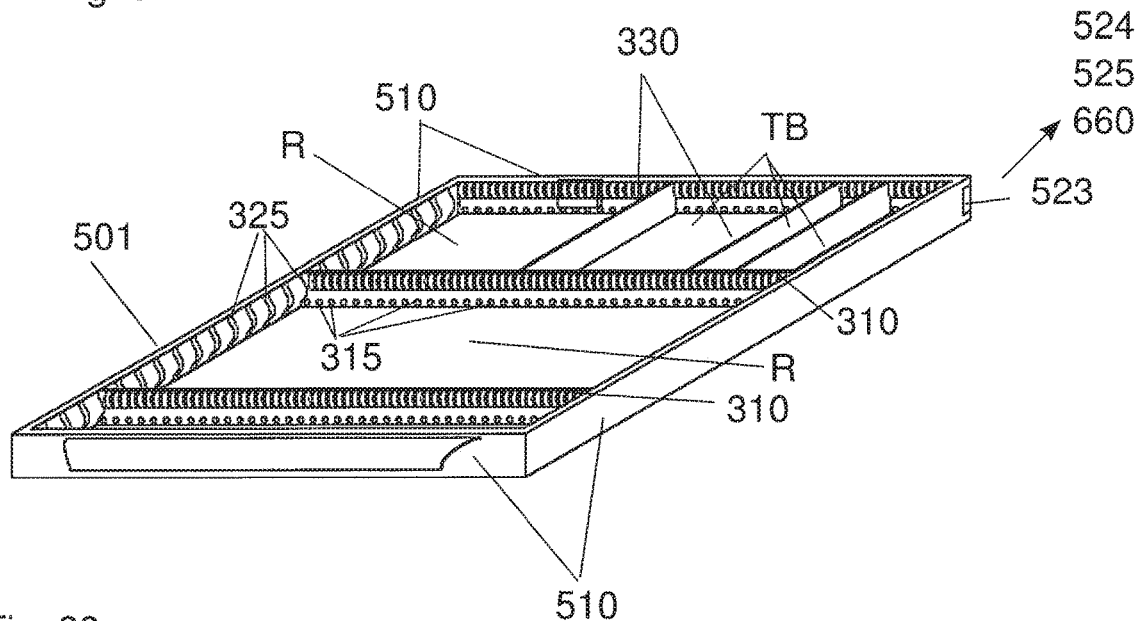
Figure 34:
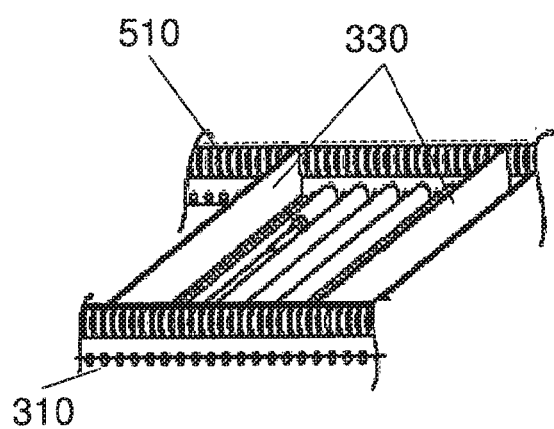
Figure 34:
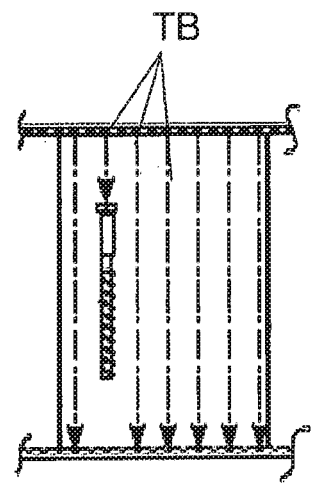
Figure 35:
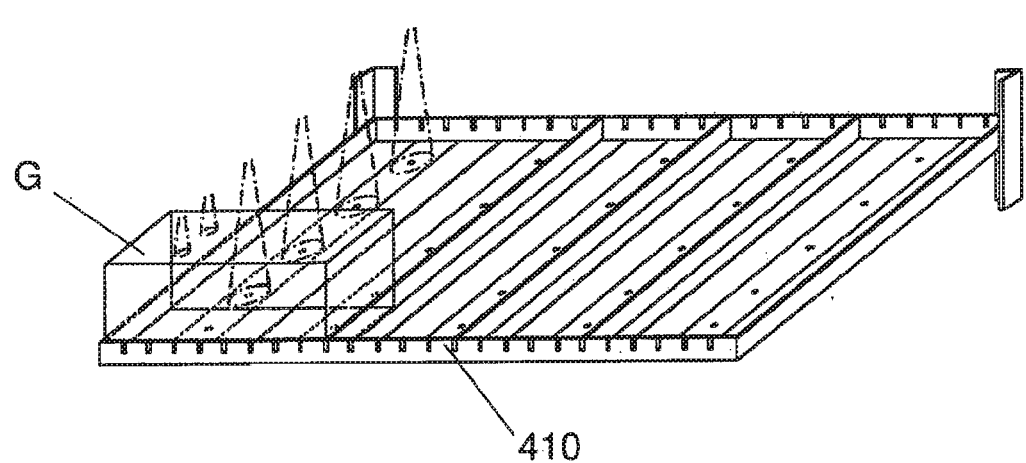

The drawings show the following:
FIG. 1: a perspective view of a sensor assembly;
FIG. 2 a-d: different views of a sensor assembly;
FIG. 3 a-c: perspective views of possible cross-sections of a sensor assembly;
FIG. 4 a-e: top views of possible shapes of a sensor assembly;
FIG. 5: a perspective view of a sensor assembly;
FIG. 6: a perspective view of a sensor assembly;
FIG. 7: front view of a sensor assembly;
FIG. 8: front view of a sensor assembly;
FIG. 9: front view of a sensor assembly with a partial section;
FIG. 10: side view of a sensor assembly;
FIG. 11: diagram of possible signals;
FIG. 12: side view of a sensor assembly;
FIG. 13: top view of a sensor assembly;
FIG. 14 a,b: schematic representation of a sensor system;
FIG. 15 a,b: side view of a sensor system;
FIG. 16: side view of a sensor system;
FIG. 17: side view of a sensor system;
FIG. 18 a-c: schematic representations of a storage device;
FIG. 19 a-d: schematic representations of a storage device having different occupancy states;
FIG. 20 a-c: side views relating to an arrangement of a sensor assembly at a storage device;
FIG. 21 a,b: side view of delimitation elements;

FIG. 22 a,b: side view and section of a delimitation element;

FIG. 23 a,b: perspective representations of delimitation elements;

FIG. 24 a,b: perspective representations of delimitation elements;

FIG. 25: perspective representation of a delimitation element;

FIG. 26: perspective representation of a delimitation element;

FIG. 27: perspective representation of a delimitation element;

FIG. 28 a-c: perspective representation as well as top view and detailed view of a delimitation element;

FIG. 29: perspective representation of a shelf;

FIG. 30: perspective representation of a shelf unit;

FIG. 31 a,b: shelf and section through plural shelves;

FIG. 32: perspective representation of a cupboard;

FIG. 33: perspective representation of a drawer;

FIG. 34 a,b: perspective representation of a section of a drawer as well as a top view of a drawer;

FIG. 35: perspective representation of a shelf.

DETAILED DESCRIPTION OF EXEMPLARY EMBODIMENTS

FIG. 1 shows a perspective view of a sensor assembly 100, which, in an embodiment according to the invention, may be manufactured with a carrier (or supporting device) 10 made of a flexible material. The view is obliquely from the above onto the front left corner, which is represented lifted up here, and enables a view both on the upper side 12 and on the lower side 14. At least one sensor element 20 may be arranged both on the upper side and on the lower side 12, 14 on the sensor assembly 100 according to the invention.

This arrangement may enable the sensor assembly to function in two directions (FIG. 2 a). In principle, each of the outer surfaces of the sensor assembly can be equipped with sensor elements, such that a sensor assembly could function in all three spatial axes, respectively, in two directions. In FIG. 2 b, such a sensor assembly having the sensor elements at least on two side surfaces 12, 13 is represented in a top view. The representation of sensor elements in the remaining side surfaces 11, 14 and in the front surfaces has been dispensed with. A sensor assembly as in FIG. 2 b, together with further sensor assemblies being deviated by 90° respectively, could surveil (or monitor) a space (or chamber, or area, or volume) at its space borders. A sensor assembly according to FIG. 2 c, in combination with further sensor assemblies, could surveil a space diagonally respectively, with an embodiment as in FIG. 2 d also in the direct spatial axes.

At this time, the cross-section of a sensor assembly can assume plural possible shapes (FIGS. 3 a-c). For an incorporation of respective sensor elements, those shapes (or forms) may be suitable at best, which may provide a plane surface with respect to the dimensions (or sizes) or the number of the incorporated sensor elements, for which [purpose] a cross-section having corners (or angles) may be most suitable.

FIGS. 4 a-c show the top views of plural possible forms (or shapes) of sensor assemblies for a best possible adaptation to the space to be surveilled (or monitored). If the sensor assembly is to be optimized with respect to the design shape of the space to be monitored, the assembly can be manufactured with a form (or shape), which is not holohedral (or not covering the whole surface), but nevertheless covering the space in a best possible way, such as cruciform (or crosswise) (FIG. 4 d) or meander-shaped (FIG. 4 e), wherein the sensors can be put on the dashed line, or the shape of the carrier is narrow and follows the dashed line.

In an embodiment according to the invention, the sensor assembly may be formed as a flat stripe (or strip) (FIG. 4 b), i.e. the height may be much smaller than the width at this time, wherein the width may be smaller than the length. It may also be possible to form a longer sensor assembly from a carrier 10 having two or also more sections 10 a, 10 b, which may incorporate the sensor elements later on, and to connect the sections to each other by one flexible partial section respectively, wherein the partial section may contain in particular also the electrical lines for the power supply and the signals of the sensor elements (FIG. 5).

FIG. 6 shows a perspective view of a sensor assembly 100, in an embodiment according to the invention, having a stripe-shaped carrier 10. At this time, the carrier (or supporting device) 10 can be manufactured from a rigid or from a flexible material, but also from a composite of plural layers of a same material or of different materials. In the embodiment according to the invention, the carrier 10 may act at the same time as a conductor board, and may be provided with corresponding conductor paths 15 as well as points (or locations) for contacting the sensor elements 20 and/or possibly further electrical components or component groups. The conductor paths 15 as well as also the contact surfaces for the sensors can be applied directly on the carrier, or also on a foil (or sheet), which is laminated on the carrier later on.

FIG. 7 shows the front view of a sensor assembly 100 according to the invention having one sensor element 20 arranged, respectively, on an outer surface 12, 14. The sensor elements 20 may be, respectively, exemplars of one type of device, and may namely be formed as a signal transmitting device (or signal transmitter) 21 or as a signal receiving device (or signal receiver) 22. The signal transmitting devices and the signal receiving devices may be implemented for signals of one type. According to the principle of transmitter-receiver, these may be all types of signals, which may be transmittable and receivable (or capable to be transmitted and to be received), in particular light signals, preferably IR (infrared) light or acoustical signals, preferably ultrasound signals. Light signals are assumed in the further embodiment examples. Here, the signal transmitting devices 21 are represented schematically as circles or closed semi-circles, while the signal receiving devices 22 are represented schematically as open semi-circles and/or "dishes" having the opening pointing away from the respective outer surface. For the sensor elements 20, an orientation direction OR is to be understood such that a straight line leads from their center point and from the highest and/or deepest point of the circle line with respect to the respective outer surface, which straight line indicates the major output or entry direction of the signals.

In a further embodiment according to the invention, a test signal transmitting device (or test signal transmitter) 26 may be arranged beside (or is associated to) a signal receiving device 22, i.e. in immediate or at least collateral distance to the signal receiving device 22 (FIG. 8). Thereby, the operational reliability (or functional safety) of the sensor assembly and/or of the superordinate system can be improved by thereby testing the functional efficiency of the signal receiving device again, if a signal of a first opposing sensor assembly has been transmitted, but no signal has been received. Basically, the same principle may also be applied to a signal transmitting device.

The sensor elements may be integrated in the carrier 10 at least partially on a respective outer surface both as a signal transmitting device 21 and as a signal receiving device 22, so as to protect an according to sensor element on the one hand, or to also obtain a smooth outer surface on the other hand. In FIG. 9, a signal receiving device 22 is shown, which may be integrated completely in the carrier 10 in a partial section on an outer surface 12. At the lower side 14, the integration of a signal transmitting device may be effected by a further layer 32 laminated thereon such that the signal transmitting device 21 may be considered to be integrated in the carrier at least partially, wherein the protection layer 32 may have recesses at the corresponding locations of the positions of a sensor element 20, and thus also may protect the sensor elements and/or the corresponding conductor paths or may provide a smooth outer surface (FIG. 9).

FIG. 10 shows a side view of a sensor assembly 100 having a plurality of sensor elements 21, 22 arranged at a respective outer surface 12, 14, wherein only sensor elements of one type (of device) may be arranged on one outer surface, respectively. In this manner, many sensor assemblies can be combined with each other cascadingly (or in a cascaded manner), i.e. oriented always in one direction. The distance of the sensor elements among each other on one respective outer surface can be selected such that a signal transmitting device always addresses (or appeals to) only one signal receiving device or also plural signal receiving devices by arranging the sensor elements 21, 22 so close to each other that the signal cones may overlap on the receiver side.

FIG. 11 shows a diagram with respect to plural signals. A first signal S1 shows two different occupancy states BZ1 and BZ2, wherein no signal S1 may be received in the occupancy state BZ1 and thus may be interpreted as a sensor area that is occupied with storage goods, whereas a signal S1 may be received in the occupancy state BZ2 and thus may be interpreted as a sensor area without storage goods. Signals S2-S4 show signals having different intensity, modulation or having individual frequency blocks. These signals can be used for improving the signal and/or data integrity, or also for addressing or identifying individual sensor elements, in particular in the case of overlapping signal cones.

FIG. 12 shows a side view of a sensor assembly according to the invention having again a plurality of sensor elements 20 arranged on opposite outer surfaces of the carrier 10, wherein the upper sensor elements 20, by a protective layer 32, may be embedded at least partially in a protective layer 32, and thus an approximately smooth surface may be achieved. By contrast, on the opposite outer surface, the sensor elements 20 may be integrated completely in the carrier 10. On this lower side, an adhesive layer 30 may be applied, which may be covered by a non-adhesive covering layer 31. At least the adhesive layer 30 may have according recesses at the positions of the sensor elements 20, so as to not damage or contaminate the sensor elements 20, and so as to let pass the signals unobstructedly (or unhinderedly) later on. For a later mounting, the non-adhesive covering layer 31 may be removed from the adhesive layer 30, and thus can be aligned on a device 300 and affixed (or mounted) to the device 300 by the adhesive layer 30.

FIG. 13 shows a top view of a sensor assembly 100 according to the invention having a carrier 10 and conductor paths 15 arranged on the carrier 10 as well as sensor elements 20 connected to the conductor paths 15. A small rigid conductor board may be mounted at the right end of the sensor assembly, which conductor board may contain the control electronics 16 that may be necessary for controlling the sensor elements 20 and further electric or electronic components 23, for example a plug connector element 23 to be used for power supply and for receiving and/or outputting control signals 24/25 of the sensor elements 20 for transmission to a superordinate sensor system 200 and/or to a superordinate control system 260. The sensor assembly 100 may have additional markings and/or devices 40 for fixing to a device, which may be implemented as optical (or visible) markings (e.g. as an arrow) or as shapes (e.g. semi-circles, drill holes). In particular, the drill holes can be used to fix the sensor assembly 100 to a defined position with a screw etc. later on.

FIG. 14 a shows schematically the arrangement of a sensor system 200 consisting of a surveillance space (or monitoring chamber, or monitoring area) R and two sensor assemblies 100 a, 100 b, which may border or may encompass this space (or chamber) at least partially, wherein the sensor assemblies may oppose each other at least partially. The sensor assemblies 100 a, 100 b and/or the sensor elements 21, 22, which may be arranged on these mutually facing outer surfaces, may be arranged at this time such that at least one signal transmitter 21 of the first sensor assembly 100 a may approximately oppose a signal receiver 22 of a second sensor assembly 100 b, such that a signal emitted from the signal transmitter 21 can be sent through the surveillance space R to the signal receiver 22 of the second sensor assembly 100 b and can be received. Such an arrangement can be implemented in space arbitrarily. FIG. 14 b shows two vertically aligned sensor assemblies 100 a, 100 b, wherein here the signal S may be sent horizontally through a surveillance space R and may be received.

FIG. 15 a shows, in a side view, an embodiment according to the invention of a sensor system 200 having an arrangement of two sensor assemblies 100 a, 100 b, wherein the sensor assemblies may be aligned opposingly relative to each other such that the sensor elements 20 a and 20 b arranged at the mutually opposing outer surfaces 14 and 12 b can interact with each other, i.e. a signal S sent from a signal sensor element 20 a can be received by a second sensor element 20 b.

At this time, the sensor elements may be positioned and selected in terms of their type with respect to each other such that in the sensor assemblies 100 a, 100 b, at their outer surfaces 14 a and 12 b facing each other, always one signal transmitter 21 and one signal receiver 22, respectively, may be opposing each other (FIG. 15 b). Further sensor elements may be arranged on the outer surfaces of the two sensor assemblies 100 a, 100 b, which may face away from each other, wherein the further sensor elements may be respectively complementary to the very sensor element, which may be located on the respective sensor assembly on the outer surface facing the other sensor assembly. In this context, the term "complementary" refers to the respective other type of a sensor element. In FIG. 15 a, the sensor assembly 100 a with its outer surface 14 a having a signal transmitter 20 a may be located facing the outer surface 12 b of the sensor assembly 100 b having a signal receiver 20 b. Thus, the further sensor element 20 c, which may be arranged on the outer surface 12 a that does not face the sensor assembly 100 b, may be embodied as a signal receiver. In the sensor assembly 100 b, the further sensor element 20 d may be formed as a signal transmitter on the outer surface 14 b that may face away from the sensor assembly 100 a. Accordingly, all sensor elements of different sensor assemblies of respectively one type of the devices may each be oriented in one direction OR, and namely all signal transmitters may be oriented in a first direction OR 21 and all signal receivers may be oriented in a second direction OR 22 (FIG. 15 *b*).

FIG. 16 shows, in a side view, a sensor system 200 according to the invention having four sensor assemblies 100 *a-d*, which may be arranged one over the other, in which the respective signal transmitters 21 *a-d* may be oriented in a first direction OR 21 from the upper side downward, and all signal receivers 22 *a-d* may be oriented in a second direction OR 22 from the lower side upwards. In this manner, it may be possible to efficiently arrange plural sensor assemblies that may be identical in construction, in a total sensor system, and to combine them with each other cascadedly (or in a cascading manner). At this time, sensor elements, which may act with each other, of at least two neighbouring sensor assemblies may be arranged on a common axis A.

FIG. 17 shows a sensor system 200 according to the invention, having three sensor assemblies 100 *a-c*, which may be arranged over each other respectively, and which may have a plurality of sensor elements 20, respectively. The sensor elements of one type of the devices may again be oriented exclusively in a first direction OR 21 and in a second direction OR 22. The sensor elements, which may act with each other, of different sensor assemblies may all be located on a common axis A respectively. Between two respective facing sensor assemblies 100, there may be a surveillance space R (or monitoring area), respectively, having a plurality of signal elements of different sensor assemblies, which elements may act together at least pairwisely. The surveillance spaces R can be subdivided in smaller partial sections TB, in that the control electronic 260 respectively may define groups and may assign these groups to the respective partial sections TB.

FIGS. 18 *a-c* show schematically a storage device 300 having a sensor system 200. To this end, the storing device 300 includes a storage space (or storage chamber) R for receiving and/or a deposit space (or positioning area), for a storage good. The space may be at least partially bordered and/or enclosed by a delimitation element 310 (FIG. 18 *c*) or by sections 321, 322 of a delimitation element 310 (FIG. 18 *b*) or by two different delimitation elements 310 *a*, 310 *b* (FIG. 18 *a*).

In an embodiment, for this purpose, a sensor system 200 having two different sensor assemblies 100 *a*, 100 *b* may be arranged on two delimitation elements 310 *a*, 310 *b*, such that at least one signal transmitter 21 of the first sensor assembly 100 *a* can interact with at least one signal receiver 22 of the second sensor assembly 100 *b*, wherein a signal S sent by the signal transmitter 21 may be sent through the surveillance space R to the signal receiver 22 (FIG. 19 *a*). If no storage good blocks the path of the signal S, then the signal receiver 22 may receive the signal S sent by the signal transmitter 21 and may interpret this as a first occupancy state BZ1, namely that no storage good may be contained in the surveillance space R (FIG. 19 *b*).

However, if a storage good G is contained in the surveillance space R, the signal path S may be disturbed and a signal S sent by a signal transmitter 21 cannot be received by the signal receiver 22 (FIG. 19 *c*), which may be interpreted as a second occupancy state BZ2, namely that a storage good may be present in the surveillance space R (FIG. 19 *d*).

FIGS. 20 *a-c* show different possibilities according to the invention of the arrangement of a sensor assembly 100 on a delimitation element 310. A sensor assembly 100 may be arranged either on an outer surface of a delimitation element 310, which surface may face the surveillance space R (FIG. 20 *a*). A second possibility may be to arrange the sensor assembly 100 on an outer surface of a delimitation element 310, which surface may face away from the surveillance space R (FIG. 20 *b*). A further possibility may be to integrate a sensor assembly 100 at least partially in a delimitation element 310 in an according recess 318 (FIG. 20 *c*).

In an embodiment according to the invention for the arrangement of a sensor assembly 100 according to the FIGS. 20 *b* and 20 *c*, according to which the sensor assembly 100 and sensor elements 20 arranged therein would have no access to the surveillance space R and thus could send or receive no signals S, an opening may be introduced in the delimitation element 310 as a signal opening 315 for the passing through of signals of the sensor elements (FIG. 21 *a*). This signal opening 315 can be either punched or drilled into the delimitation element 310, and may enable a sensor element 20 for an interaction with a complementary sensor element through the surveillance space R. FIG. 21 *a* shows a sensor assembly, which may be arranged at a back side of a delimitation element 310 facing away from the surveillance space R, and which may have a signal opening 315 through the total strength (or thickness) of the delimitation element 310. In an integrated sensor assembly 100, there may be provided at least one signal opening 315 at at least one side or at least two signal openings 315 at both sides at the respective locations of the sensor elements 20 (FIG. 21 *b*).

The sensor element 20 may protrude from the surface of the sensor assembly 100 and thus may fill such a signal opening 315 at least partially. At this time, the sensor assembly may be positioned and at least in an attempt fixed in relationship to the delimitation element, such that the at least one sensor element 20 may come securely in coverage with the signal opening 315. In a further embodiment, the signal opening 315 may be filled at least partially with a material 316, which may be transparent for the type of signal used by the sensor elements, e.g. with a transparent synthetic resin. Thus, a smooth surface is present and no dirt, which would disturb the signals, can accumulate in the signal openings (FIG. 22 *a*).

Alternatively or in addition, a further protective layer 316 may also be applied, e.g. a foil (or film) or an adhesive tape of a transparent material (FIG. 22 *b*).

In one embodiment of the invention, for the arrangement of a sensor assembly 100, a device (FIG. 23 *a*) or a receiving space 318 (FIG. 23 *b*) may be arranged at a delimitation element 310. FIG. 23 *a* shows a device having an opening 317, into which a sensor assembly (not represented) can be pushed, and which may engage behind the device, such that the sensor assembly may be held securely at an outer surface. In the delimitation element 310, signal openings 315 corresponding to the surveillance space R may be introduced, such that the sensor elements of a sensor assembly (not represented) can send or receive signals.

FIG. 23 *b* shows a recess, which is intended for the receiving of a sensor assembly (not represented), the recess being in the form of a cavity 318, which may be accessible from above. In a further embodiment, a sensor assembly 100 may be laid flushingly thereinto. Signal openings 315, which open downwardly, may be introduced in the cavity.

FIG. 24 *a* shows a delimitation element 310 having a cavity 318, which may open upwardly 317, into which a sensor assembly 100 can be put into from above. FIG. 24 *b* shows a delimitation element 310 having a cavity 318 which may open towards a side 317, and into which a sensor assembly 100 may be insertable.

FIG. 25 shows the lower side 14 of a plate-shaped delimitation element 310 having a placement side for storage goods located at the upper side and accordingly with a surveillance space, which may be lying at the upper side with respect to the gravity F, and on which plural sensor assemblies 100 may be arranged parallel to each other. The sensor assemblies 100 may be aligned on the delimitation element 310 according to the sensor elements 20 arranged on the outer surfaces such that the sensor elements 20 may come in coverage with the corresponding signal openings 315. The flexible sensor assemblies 100 may subsequently be fixed to the outer surface 14 of the delimitation element 310 with an adhesive layer present on one side of the sensor assembly.

Each sensor assembly 100 may have a plurality of sensor elements 20, which may be arranged, respectively, in a row (or line) at the respective sensor assembly 100. Because plural sensor assemblies 100 may be arranged on the delimitation element 310, respectively, parallel to each other, there may result a sensor matrix (FIG. 26), which can be controlled and/or evaluated selectively also in partial areas, respectively, with a control electronics 260 (FIG. 27).

In an embodiment according to the invention, the delimitation elements 310, which may border or enclose a surveillance space, may have devices 325 (FIG. 28 a) for receiving further delimitation elements 310 and/or separating elements 330 for the establishment of partial sections (or sub-sections) TB within a surveillance space R (FIG. 28 b). For this purpose, the further delimitation elements 310 or separating elements 330 may be inserted (or slid-in) the devices 325 from above, such that an approximately rectangular corner, and in connection with the same procedure at the other end of the inserted delimitation element 310 or separating element 330, in total an isolated (or partitioned) partial section TB may be generated. In one embodiment, the devices 325 may have contact surfaces 326 at their sides (FIG. 28 c), such that delimitation elements slid in there and the sensor assemblies contained therein may be connected electrically with the sensor system and/or the storage device. Furthermore, the delimitation elements 310 or the separating elements 330 may contain current lines and data lines 327, so as to integrate inserted elements in the power supply and data lines of the drawer (FIG. 28 b).

FIG. 29 shows in perspective a shelf 410 having sensor assemblies arranged at the lower side 14 and signal openings 315 passed through the supporting surface for storage goods. In addition, the shelf may be subdivided in plural shelf compartments by separating elements 330 extending parallel to the sensor assemblies. A frame, which may run around the shelf on all sides may prevent a lateral falling out of stored storage goods.

FIG. 30 shows a storage device formed as a shelf unit (or rack) 400 having a first shelf 410 for receiving storage goods as well as further shelves 410, wherein, due to the spatial arrangement relative to each other, a surveillance space R may be defined, respectively, between two shelves 410, wherein a plurality of sensor assemblies 100 may be arranged at the lower side 14 of the shelf 410 located above a surveillance space R.

FIG. 31 b shows a section through a shelf unit 400 having in total three shelves 410 and two surveillance spaces R. The section cuts through a sensor assembly 100 arranged at the position (or height) of sensor elements 20 arranged on a line (FIG. 31 a). At the lower side of each shelf 410, a sensor assembly 100 may be arranged, wherein the signal transmitters 21 may be oriented from the top downwardly (OR 21) and the signal receivers 22 may be arranged from the bottom upwardly (OR 22). At one side, the shelves may have a slope (or decline), which may make sure that the gap of (or left by) a withdrawn storage good G, e.g. a package with screws, may be closed by sliding-down packages, and that a package may always be available at the front at a withdrawal location as long as there are still packages in the corresponding goods shelf. Packages that may be present in the storage shelf prevent the receiving of signals S that may be sent from the signal transmitters 21 arranged above the packages by the signal receivers 22 and may be obscured by the packages, so that a signal S, which may be sent but not received, may be interpreted as a first occupancy state and as "being present". At locations, where no package may be present any more, a signal S can be received, which may be interpreted as a second occupancy state and as "empty". The individual occupancy states may be prompted either periodically or due to an event, e.g. a manual request, and may be signalled to a superordinate management system, which may perform an inventory update on the basis of the storage location and/or the assignment of a surveillance space R and/or its partial sections to particular goods, and may trigger order transactions as the case may be.

FIG. 32 shows a cupboard 500 as a storage device having at least one drawer 501 and a surveillance space R contained in the interior space of the drawer.

The drawer 501 may be formed by a drawer bottom plate (or drawer base) as a supporting surface for storage goods and a frame formed of four side walls 510 running around the bottom plate. The side walls 510 may have fixing devices 325 for inserting further delimitation elements 310 as well as further separating elements 330. Sensor assemblies may be integrated in the delimitation elements 310 arranged transversely to the pulling-out direction and/or in the front sides and the back sides 510, wherein signal openings 315, respectively corresponding to the sensor elements, may be present at the outer surfaces pointing towards the surveillance space R. Also here, sensor elements of only one type of the devices may be oriented in only one direction parallel to the pull-out direction. A central plug connector 523 for the power supply 524 as well as for the data lines 524 may be arranged on a drawer 501, respectively, in the rear section. In the course of an opening (or pulling-out), the drawer 501 with the plug connector 523 may be pulled out of a counterpart arranged on the corpus of the cupboard 500, such that all electrical components may be without power supply. If necessary or desired, the drawer may be provided with an energy buffer storage in this case. In the course of a closing (or sliding-in), the drawer 501 with the plug connector 523 may slide into the counterpart on the corpus, and may establish again a connection to the power supply 525 as well as to the data lines 524. The closing may trigger a measurement of the individual occupancy states, and the data may be transmitted to a superordinate system 660 for an evaluation and/or for an inventory update (FIG. 33).

Also here, separating elements 330 make possible a sub-division of a drawer 501 and of the surveillance space R located therein into smaller partial sections TB and/or individual compartments (FIGS. 33 and 34 a). By removable shelves, a respective partial section TB can be assigned to exactly one pair of sensor elements (FIGS. 34 a and 34 b).

The separating elements 330 can be removed and inserted (or plugged in) anew as a function of the requirements. Thereafter, the system may have to be initialized anew, in that the system may automatically detect and store the inserted separating elements 330 and/or the partial sections TB defined by the separating elements 330 in at least one drawer device 501. The recognition (or detection) of the separating elements 330 and their position with respect to a sensor group (or sensor assembly) and/or to individual sensor elements or sensor elements combined to groups may be effected, in that the signal transmitting devices, which may be arranged at a front side (or face side) of the separating element 330 transverse to the separating element 330, may be switched on and off stepwisely, and the signals of the opposing signal receiving devices may be evaluated, in that an output signal may be capable to be received without hindrance by a separating element 330 from plural signal receiving devices that may be arranged oppositely and beside each other, wherein in the case of a separating element 330 being present, however, a signal can be received only maximally from the signal receiving device that may be arranged directly oppositely and abuts on the separating element, whereby a sharp boundary may be detectable due to sent, but not received, signals, and may be interpreted as a separating element being present. For this purpose, the signal transmitting devices may have to output, respectively, a slightly cone-shaped signal, such that beside the directly opposing signal receiving device also at least the neighbouring signal receiving devices may be capable to receive a signal. Furthermore, piece goods, which may have been stored thereinto before as the case may be, may have to be removed at least in the partial sections TB, which may adjoin the newly inserted separating element 330, such that only a separating element 330 being present may be to be considered, if signal receiving devices that may be arranged in a direction aside are capable to receive signals (FIG. 32-34 b).

After a new sub-divisioning of a surveillance space R of a drawer device 501, the control system may be switched to a normal operating mode, such that then, signals, which may not be received or may be at least significantly weaker, may suggest piece good being present. Significantly weaker may mean e.g. that five signal transmitting devices and five signal receiving devices may be associated to one partial section TB separated by a separating element 330, whereas upon the signal output from these five signal transmitting devices only two signal receiving devices may receive a signal (FIG. 32-34 b).

FIG. 35 shows again on the basis of the example of a shelf 410 and on the basis of the sensor matrix, how surveillance spaces may be established in an embodiment according to the invention, which surveillance spaces may not only correspond to a sensor strip and may be arranged at a distance from one sensor element to the next, but that sensor elements, which may lie adjacently both in (the direction of) the depth and the width, can be switched together to logical shelves and can be patterned according to the actual sizes of goods to be stored therein, such that specific occupancy states can be generated in the system as a function of the size of the goods and can be inquired (or prompted) accordingly.

In the following, further advantageous embodiments are described:

Preferably, there may be provided a sensor assembly, which may have a carrier element having at least two sensor elements, wherein the sensor elements may be arranged on different outer surfaces of the carrier element.

It is preferred that the carrier element may have an angled, preferably a triangular or a quadrangular, in particular a quadratic or rectangular, cross-section.

It is proposed that the carrier element may be formed angledly, circularly, cross-shapedly, y-shapedly, strip-shapedly, grid-shapedly, meander-shapedly and/or star-shapedly.

It is further proposed that the carrier element may be rigid, flexible or semi-flexible, or may have at least two rigid, flexible or semi-flexible sections, which may be connected to each other.

It is possible and is thus proposed that the carrier element may be constructed from a foil (or film), or of plural layers of same or different foils (or films) and/or materials.

Preferably, it can provided that the carrier element may be formed at least partially as a printed circuit board having conductor paths, or may have at least electrical conductor structures for an electrical contacting and/or transmission of the signals of the sensor elements and/or further electrical and/or electronical components and/or for a connection to a data bus and/or to a power supply and/or for a connection to at least one further sensor assembly.

It is further proposed that a sensor element may be formed respectively as a signal transmitting device (or signal transmitter) or as a signal receiving device (or a signal receiver).

It is preferable that a test signal transmitter may be associated to (or provided adjacent to) a signal receiver such that the signal receiver can detect directly or indirectly signals of the associated test signal transmitter.

Furthermore, it is proposed that at least first sensor elements of a first outer surface of the sensor assembly may be formed complementary to the at least second sensor element of a second outer surface of the sensor assembly, in particular that the first sensor element may be formed as a signal transmitter and the second sensor element may be formed as a signal receiver, or that the first sensor element may be formed as a signal receiver and the second sensor element may be formed as a signal transmitter.

In a further developed embodiment, it is proposed that at least two sensor elements may be formed complementary with respect to each other and may be arranged at respectively mutually opposing outer surfaces of the carrier element, in particular that a first sensor element may be formed on a first outer surface as a signal transmitter and the second sensor element may be formed on a second outer surface opposite to the first outer surface as a signal receiver, or that a first sensor element may be formed on a first outer surface as a signal receiver and the second sensor element may be formed on a second outer surface, opposite to the first outer surface, as a signal transmitter.

It is advantageous that the sensor elements may be arranged at least partially integrated on or in an outer surface of the carrier element.

Preferably, it can be provided that the signal, which may be emitted by at least one signal transmitter and received by at least one signal receiver, may be a magnetic signal, an electromagnetic signal, or an acoustic signal.

In a further developed embodiment, it is proposed that the signal transmitter may have at least an LED, an OLED or a piezo-crystal, or is formed of an array of one of these elements.

In particular, it is proposed, that IR light may be emitted from at least one signal transmitter.

Furthermore, it is proposed that at least one sensor element and/or at least one conductor path may be printed.

It is further proposed that a control electronics may be mounted on the carrier, wherein the control electronics may identify distinctly (or uniquely) the sensor assembly as opposed to other sensor assemblies.

It is further proposed that the control electronics may activate the sensor elements, and may register, further may process, and may transmit the data signals of the sensor elements.

In a further developed embodiment, it is proposed that the signal, which may be generated by the control electronics and emitted by the signal transmitter, may be variable in terms of its frequency and/or its intensity.

In a still further developed embodiment it is proposed that the emitted signal may be clocked (or synchronized) such that the signal may be coded.

It is further proposed that an operation state related to the sensor elements that may be present can be activated or inquired (or prompted) by the control electronics individually, group-wisely or all at once, in particular, that a signal transmitter may output a signal, or that a signal receiver may be inquired as to whether it receives a signal.

It is further proposed that the carrier element may have more than two, preferably a plurality of, sensor elements on at least one outer surface, which may be arranged in a defined manner with respect to each other, preferably on at least one line or in at least one row.

In a further developed embodiment it is proposed that sensor elements for different types of signals may be grouped jointly, and/or are arranged alternatingly, on an outer surface of the carrier element.

In a still further developed embodiment it is proposed that only sensor elements of one type of the devices may, respectively, be arranged on one outer surface, in particular that the sensor elements arranged on an outer surface may be formed respectively only as signal transmitting devices or respectively only as signal receiving devices.

It may be provided advantageous that the signal transmitting devices and the signal receiving devices may be grouped jointly, and/or may be arranged alternatingly, on an outer surface of the carrier element.

It is further proposed that a marking may be present for a later positioning and/or alignment of the sensor assembly.

It is further proposed that a fixing device may be present for a later positioning and/or fixing of the sensor assembly.

It is further proposed that the carrier element may have an adhesion surface on at least one outer surface.

In a further developed embodiment, it can be provided that the adhesion surface may be covered at least temporally with a detachable covering foil (or film).

Further, advantageously, a sensor system for an occupancy detection with at least two sensor assemblies may be provided, wherein the sensor assemblies may be arranged in at least one position such that they may comprise at least partially a surveillance space, and such that an emitted signal of at least one signal transmitter of a first sensor assembly may be detectable in at least one occupancy state by at least one signal receiver of a second sensor assembly, so that a received signal may be interpreted as a first occupancy state, and a sent, but not received, signal may be interpreted as a second occupancy state.

In a further developed embodiment, it is proposed that the sensor assemblies may be arranged in at least one position relative to each other such that at least a respective one of their outer surfaces faces an other one at least partially, and that at least one sensor element may be arranged on each one of the at least partially facing outer surfaces, which sensor elements may, respectively, be complementary to each other, in particular that the at least first sensor element may be formed as a signal transmitting device and that the at least second sensor element may be formed as a signal receiving device, or that the at least first sensor element may be formed as a signal receiving device and that the at least second sensor element may be formed as a signal transmitting device.

It is further proposed that at least one further sensor element may be arranged for at least one of the sensor assemblies on at least one of the outer surface that may not face an other sensor assembly.

It is further proposed that at least one further sensor element may be arranged for at least one of the sensor assemblies on the outer surface that may face away from an other sensor assembly.

In a further developed embodiment, it is proposed that the at least one further sensor element may be complementary to the type of the at least one sensor element on the outer surface that may face the at least one other sensor assembly, in particular that the sensor element may be formed as a signal transmitting device and the sensor element may be formed as a signal receiving device, or that the sensor element may be formed as a signal receiving device and the sensor element may be formed as a signal transmitting device.

In a still further developed embodiment, it is proposed that, in relation to the arrangement of the at least two sensor assemblies, the sensor elements of respectively one type of the devices all may have the same orientation, in particular that all signal transmitting devices may be oriented in a first direction and all signal receiving devices may be oriented in a second direction.

It is possible and is therefore proposed that the first direction and the second direction may be oriented opposite to each other.

It is further proposed that at least two, preferably a plurality of, sensor elements may be arranged on an outer surface of a sensor assembly or of a section of a sensor assembly having a sensor element.

It is further proposed that the sensor elements of two neighbouring sensor assemblies may, respectively, be positioned approximately on a common axis.

It is further proposed that only sensor elements of one type may be arranged on the mutually facing outer surfaces of a sensor assembly or of a section of a sensor assembly having a sensor element, in particular that sensor elements arranged on a respective outer surface may be formed only as signal transmitting devices or only as signal receiving devices.

In a further developed embodiment, it is proposed that the sensor elements may be spaced at a distance to each other such that at least one pair of sensor elements may be present for a smallest unit to be measured, in particular that at least one signal transmitting device and at least one signal receiving device may be present, respectively, for a smallest unit to be measured, preferably that plural signal transmitting devices and plural signal receiving devices may be present for a smallest unit to be measured.

It is further proposed that a control electronics may coordinate pair-wisely or group-wisely (or in a pairwise manner or in a group-wise manner) sensor elements, which respectively may function complementary and act with each other, of the at least two sensor assemblies or of different sensor assemblies, in particular may synchronize with each other, and in particular may control the transmission and the detection of signals.

In a further developed embodiment, it is proposed that the surveillance space may be subdivided into at least two partial sections (or sub-sections), wherein the partial sections may, respectively, be managed logically by the control electronics, wherein in particular at least one signal transmitter and one signal receiver or a group of sensor elements, which may function complementary and may act with each other, may be assigned to a first partial section, and at least one further signal transmitter and one further signal receiver or a group of further sensor elements, which may function complementary and may act with each other, may be assigned to a further partial section.

In a still further developed embodiment, it is proposed that the control electronics may evaluate the detected signals further, and may relay the signals and/or the determined occupancy states to a superordinate storing device or to a superordinate control unit on the basis a communication device.

Further, advantageously, there is provided a storing device for storing and managing storing good, in particular piece good and/or bulk good, wherein the device may have at least one surveillance space for the receiving of the storage good, and a sensor system.

It is proposed that the occupancy state and/or the degree of filling of the surveillance space may be monitored (or surveilled) by at least two approximately opposing sensor elements, wherein in at least one occupancy state an emitted signal S of at least one signal transmitter of a first sensor assembly may be detectable by at least one signal receiver of a second sensor assembly, such that a received signal can be interpreted as a first occupancy state, and a sent, but not received, signal or a dampedly received signal can be interpreted as a second occupancy state, wherein the combination of plural occupancy states can be interpreted as a degree of filling.

It is further proposed that the surveillance space may be at least partially defined (or delimited) by at least two delimitation elements or by at least two sections of a delimitation element, wherein the delimitation elements or the sections may approximately oppose each other at least partially, respectively, with at least one outer surface.

It is further proposed that at least one sensor assembly may be arranged, respectively, on a delimitation element, or, respectively, on a section.

Preferably, it can be provided that at least one sensor assembly may be arranged on an outer surface of a delimitation element, which outer surface may face the surveillance space.

In a further developed embodiment, it is proposed that at least one sensor assembly may be arranged on the outer surface of the respective delimitation element, which outer surface may face away from the surveillance space.

In a still further developed embodiment, it is proposed that at least one sensor assembly may be at least partially integrated in the respective delimitation element at least on one side of the surveillance space.

Advantageously, it can be provided that the delimitation element may have at least one signal opening, so that the at least one integrated sensor assembly or the at least one sensor assembly, which may be arranged on the outer surface facing away from the surveillance space, can send a signal to at least one further sensor assembly through the signal opening and/or can receive a signal from at least one further sensor assembly through the signal opening.

This embodiment may contribute relevantly to the possibility that sensor assemblies having sensors can be used on mutually opposing outer surfaces of a carrier, because, thereby, sensors of both sides can be involved in the process and can interact with other sensors. On the other hand, thereby, it may also be possible to save the half of the otherwise necessary sensor assemblies, because, with this embodiment, sensors may obtain access on two sides, and one side, respectively, may not be hindered by a usually impenetratable delimitation element, and/or otherwise only sensors, which may be populated (or equipped) on one side, may be used.

In a further developed embodiment, it can be provided that the signal opening may be filled up at least partially with a sensor element and/or that the signal opening may be at least partially covered and/or filled up with a material that may be penetratable for the signal.

It can further be provided that at least one delimitation element may have a device or a recess for an at least partial incorporation of at least one sensor assembly.

In particular, it can be further provided that the device or recess may have an opening for inserting a delimitation element on at least one outer surface.

Advantageously, it can be provided that at least one sensor assembly may be fixed to at least one delimitation element in a defined position with respect to a reference point of the storage device and/or of the delimitation element and/or of at least one further sensor assembly.

It is further proposed that at least one sensor assembly may be glued (or sticked) to at least one delimitation element.

It is further proposed that at least two, preferably a plurality of, sensor assemblies may be arranged approximately parallel to each other on a delimitation element, wherein the sensor elements that are arranged in a plane may form a sensor matrix.

It is possible and is therefore proposed that at least one separating element, preferably plural separating elements, may be arranged on, respectively, at least two delimitation elements, which may oppose each other and thus may be aligned approximately parallel to each other, wherein the separating elements may run transversely to the delimitation elements, such that at least two, preferably a plurality of, surveillance spaces may be formed.

In a further developed embodiment, it is proposed that at least one fixing device for at least one separating element may be present on at least one delimitation element on at least one outer surface.

In a still further developed embodiment, it is proposed that a plurality of fixing devices may be arranged on at least one side of a delimitation element, such that a variable sub-divisioning of the surveillance space may be possible.

It is further proposed that at least one signal transmitting device and one signal receiving device may be assigned to each surveillance space.

In particular, it is proposed that the storing device may be a shelf unit (or rack), and at least one first delimitation element may form a shelf.

It is further proposed that further delimitation elements, respectively, may form further shelf unit planes in the shelf unit, wherein the space between two respective shelf unit planes may form at least one surveillance space.

It is further proposed that the at least one sensor assembly may be arranged, according to the gravity, underneath the respective shelf of a shelf unit plane.

It is possible and is therefore proposed that sensor elements of different shelf unit planes may be aligned, respectively according to their respective position in the sensor assembly approximately on a common axis, wherein the axis may run vertically according to the gravity.

It is further proposed that sensor elements of different shelf unit planes may be oriented, respectively, according to their respective type, in only one direction, in particular that all signal transmitting devices of different planes may be oriented only in a first direction and that all signal receiving devices of different planes may be oriented only in a second direction.

In a further developed embodiment, it is proposed that all signal transmitting devices may, according to the gravitation, be oriented from the top to the bottom, and all signal receiving devices may be oriented oppositely from the bottom to the top.

It is further proposed that the shelf of respectively one shelf unit plane may have, in at least one direction, a slope (or an inclination) with respect to the horizontal plane in space.

In particular, it is proposed that the storage device may be a cupboard having at least one drawer, wherein at least two mutually opposing side walls of the drawer, as delimitation elements, at least partially may enclose a surveillance space.

In a still further developed embodiment, it is proposed that at least one sensor assembly may be integrated in at least one delimitation element forming a side wall.

It is possible and is therefore proposed that sensor elements of different delimitation elements may be oriented, respectively, according to their respective position on the sensor assembly approximately on a common axis, wherein the axis may run approximately horizontally and transverse to the gravitation F.

It is further proposed that sensor elements of different delimitation elements may be oriented, respectively, according to their respective type, in only one direction, in particular that all signal transmitting devices of different delimitation elements may be oriented only in a first direction and that all signal receiving devices of different delimitation elements may be oriented only in a second direction.

Preferably, it is proposed that all signal transmitting devices may be oriented from the backside wall to the frontside wall according to the pulling-out direction of the drawer, and that all signal receiving devices may be oriented oppositely from the frontside wall to the backside wall. Further, it is proposed that at least one further delimitation element, which may be arranged transverse to the pulling-out direction of the drawer, may be provided.

It is further proposed that at least one separating element, which may be arranged parallel to the pulling-out direction of the drawer, may be provided.

In a further developed embodiment, it is proposed that the drawer may have a drawer plug connector, which may connect the drawer at least in the closed state electrically to a power supply and/or to a data line in the corpus of the cupboard.

It is further proposed that a control unit may inquire at least one occupancy state of at least one surveillance space or of a part of a sub-divided surveillance space or of a partial section, and may evaluate the result and/or transmits this further to a superordinate management system.

It is further proposed that the control unit may manage logically at least respectively two co-operating sensor elements of at least two different sensor assemblies of the different at least subsets of co-operating sensor matrices, and thus may define a logical partial section, which may extend in a plane along an extension direction of a first sensor assembly and/or transversely to the extension direction of a first sensor assembly over at least one further sensor assembly arranged in parallel.

In a further developed embodiment, it is proposed that at least one partial section (or sub-section) may correspond to precisely one unit of a storage good to be stored.

In a still further developed embodiment, it is proposed that at least one logical partial section may correspond to at least one arrangement of delimitation elements and/or separating elements, in particular may correspond to the size of at least one partial section formed by delimitation elements and/or separating elements.

In a still further developed embodiment, it is proposed that the control unit, during an initialization process, may detect the partial sections on the basis of the arrangement of the delimitation elements and/or the separating elements among each other, and correspondingly may define the surveillance space into its logical partial sections, and may store them in the management system.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

LIST OF REFERENCE NUMERALS

100 sensor assembly
10 carrier element
11 outer surface
12 outer surface
13 outer surface
14 outer surface
15 conductor path
16 control electronics
20 sensor element
21 signal transmitting device (or signal transmitter)
22 signal receiving device (or signal receiver)
23 electric/electronic components
24 data bus
25 power supply
26 test signal transmitting device
30 adhesion surface
31 covering foil
32 protective layer/protective foil
40 marking/fixation
200 sensor system
260 control electronics
270 communication device
300 storage device
310 delimitation element
311 *a, b, c, d, e, f* outer surfaces of the delimitation element
315 signal opening for conveying signals
316 protective layer
317 insertion opening
318 recess (or cavity)
321 section of the delimitation element
322 section of the delimitation element
325 fixing device for separating element
326 contact fixing device
327 power line and data line
330 separating element
331 contact
360 control unit
400 shelf unit (or rack)
410 shelf (or floor sheet)
500 cupboard
501 drawer
510 *a, b, c, d* side walls
523 drawer plug connector 524 data bus
525 power supply
660 management system
A axis
B reference point
BZ occupancy state
E plane
F gravitation (or gravity)
G storage good/piece good
OR orientation direction
R surveillance space (or monitoring area)
S signal
TB partial section

The invention claimed is:

1. A drawer device having a surveillance space for storing piece goods, the drawer device comprising:
   a base, four side walls and at least one separating element, wherein the at least one separating element is inserted parallel to the side walls such that at least two partial sections are created, wherein at least one partial section has, on at least two opposing sides, at least one sensor assembly;
   each of the at least one sensor assemblies on one side of the at least two opposing sides of the partial section having a plurality of signal transmitting devices, and/or each of the at least one sensor assemblies on an opposing side of the partial section having the plurality of transmitting devices having a plurality of signal receiving devices;
   the drawer device further comprising:
      one control unit for providing:
         a power supply, control of signals, and/or processing of signals, wherein a signal of a signal transmitting device is detectable by the plurality of signal receiving devices of an opposing sensor assembly;
         the at least one separating element is positionable between the signal transmitting devices and the signal receiving devices the at least one separating element is arranged approximately parallel to a signal direction; and
         wherein at least one of the sensor assemblies is integrated at least one side of the partial section in the side wall or in the separating element, by means of a recess, wherein the recess has an insertion opening for inserting the at least one sensor assembly.

2. The drawer device according to claim 1, wherein only signal transmitting devices or signal receiving devices, respectively, are arranged on an outer surface of at least one of the sensor assemblies.

3. The drawer device according to claim 1, wherein an adhesion surface is arranged on a non-fitted back side of at least one of the sensor assemblies.

4. The drawer device according to claim 1, wherein signal transmitting devices are arranged on an outer surface of at least one the sensor assemblies, and signal receiving devices are arranged on the opposite outer surface.

5. The drawer device according to claim 1, wherein signal openings for conveying the signals are present in the side wall or in the separating element.

6. The drawer device according to claim 1, wherein at least one side or at least one separating element has fixing devices for plugging-in separating elements,
   wherein the fixing devices provide contacts for an electrical connection of a plugged-in separating element for power supply as well as for conveying control signals or data signals to, or from, at least one of the sensor assemblies.

7. A storage device having at least one drawer device according to claim 1, and further comprising a data bus system for transmitting the signals for controlling at least one of the sensor assemblies, the signals from the at least one of the sensor assemblies, and the power supply for the at least one of the sensor assemblies.

8. The storage device according to claim 7, wherein the drawer device has a drawer plug connector which connects the drawer device in a closed state to the power supply and the data bus.

9. The storage device according to claim 7, wherein the control unit for receiving, processing and outputting the signals for controlling the at least one of the sensor assemblies is via the data bus.

10. The storage device according to claim 7, wherein the at least one of the sensor assemblies is identifiable distinctly with respect to other sensor assemblies.

11. The storage device according to claim 7, wherein all sensor assemblies are managed in the control unit such that pair-wisely co-operating sensor assemblies, groups of pair-wisely co-operating signal transmitting devices and signal receiving devices, or at least individual pair-wisely co-operating signal transmitting devices and signal receiving devices are storable and readable again, and can be controlled individually for an outputting or an inquiring of signals.

12. The storage device according to claim 7, wherein, in the control unit, an assignment is effected between the pair-wisely co-operating sensor assemblies, the groups of pair-wisely co-operating signal transmitting devices and signal receiving devices, or at least individually pair-wisely co-operating signal transmitting devices and signal receiving devices and the drawer device or the surveillance space or the partial section.

13. The storage device according to claim 7, wherein, in the control unit, an assignment is effected between at least one surveillance space or at least one partial section and the stored piece goods, in particular which piece goods are concerned, and how an inventory determination and an inventory update are effected.

14. The storage device according to claim 7, wherein the storage device is at least one of a shelf unit, a cupboard, a tool and gear wagon, or a mobile filing pedestal.

15. A method for initializing a storing device of claim 7, the method comprising the steps of:
   a. opening the at least one drawer device;
   b. removing piece good that is present if a piece good is present;
   c. switching the control unit into an initialization mode;
   d. inserting at least one separating element for forming at least two empty partial sections;
   e. closing the drawer device;
   f. detecting the at least one inserted separating element;
   g. storing the position of the at least one separating element;
   h. mapping logical partial sections for the storing of piece goods;
   i. assigning the pair-wisely co-operating signal transmitting devices and signal receiving devices to a storage space or a partial section;
   j. switching off the initialization mode, and storing the detected data.

16. The method for initializing a storage device according to claim 15, wherein the detecting of the at least one inserted separating element is effected by a stepwise switching on and off of the signal transmitting devices, which are arranged at a front side of the separating element transverse thereto, and an evaluating of the signals of the opposing signal receiving devices, in that an output signal is capable to be received without hindrance by a separating element by plural signal receiving devices, which are opposing and arranged beside each other, wherein in the case of a separating element being present only maximally from the signal receiving device, which is arranged directly opposingly and abuts on the separating element, whereby a sharp boundary is detectable on the basis of sent, but not received, signals.

17. A method for operating a storing device according to claim 7, the method comprising the steps of:
   a. opening the at least one drawer device;
   b. storing or withdrawing piece goods;
   c. closing the drawer device;
   d. performing an occupancy recognition in the surveillance space or at least in the partial section;
   e. detecting an inventory of piece goods and, if necessary, updating the inventory;
   f. when falling below a minimum quantity, if necessary, triggering a reorder transaction.

18. The method for operating a storage device according to claim 17, wherein the performing of the occupancy recognition is effected by activating the signal transmitting device associated to a surveillance space or to a partial section and inquiring the signal receiving devices, in that a received signal is interpreted as a missing piece good, and a non-received signal or an only very weak signal is interpreted as a piece good being present.

19. The method for operating a storage device according to claim 17, wherein the performing of the occupancy recognition is triggered by a switching of a drawer device switch upon closing the drawer device.

* * * * *